United States Patent [19]

Boyd, Jr. et al.

[11] Patent Number: 4,636,936
[45] Date of Patent: Jan. 13, 1987

[54] CONTROL SYSTEM FOR AN ELECTRONICALLY COMMUTATED MOTOR

[75] Inventors: John H. Boyd, Jr., Holland, Mich.; Alexander Muller, Ellisville, Mo.

[73] Assignee: General Electric Company, Fort Wayne, Ind.

[21] Appl. No.: 710,899

[22] Filed: Mar. 12, 1985

Related U.S. Application Data

[62] Division of Ser. No. 602,163, Apr. 19, 1984, Pat. No. 4,540,921.

[51] Int. Cl.$^4$ .................. G05B 13/02; H02K 29/00; H02K 23/00; H02P 1/18
[52] U.S. Cl. .................................... 364/148; 318/138; 318/254
[58] Field of Search .................. 318/138, 254, 254 A, 318/439, 128, 341, 696, 627, 342, 344; 364/148, 200, 183, 900

[56] References Cited

U.S. PATENT DOCUMENTS

| 3,369,381 | 2/1968 | Crane et al. | 68/12 |
|---|---|---|---|
| 3,599,062 | 8/1971 | Crane et al. | 318/128 |
| 3,628,110 | 12/1971 | Casaday | 318/138 |
| 3,764,869 | 10/1973 | Woodbury | 318/138 |
| 3,783,359 | 1/1974 | Malkiel | 318/254 |
| 4,005,347 | 1/1977 | Erdman | 318/254 |
| 4,027,215 | 5/1977 | Knight et al. | 318/341 |
| 4,047,081 | 9/1977 | Liska | 318/138 |
| 4,051,417 | 9/1977 | Fujinawa et al. | 318/138 |
| 4,162,435 | 7/1979 | Wright | 318/138 |
| 4,167,692 | 9/1979 | Sekiya et al. | 318/138 |
| 4,167,693 | 9/1979 | Liska et al. | 318/138 |
| 4,169,990 | 10/1979 | Erdman | 318/138 |
| 4,234,838 | 11/1980 | Langley et al. | 318/696 |
| 4,238,717 | 12/1980 | Knight et al. | 318/341 |
| 4,250,435 | 2/1981 | Alley et al. | 318/138 |
| 4,250,544 | 2/1981 | Alley | 364/110 |
| 4,263,535 | 4/1981 | Jones | 318/254 X |
| 4,270,074 | 5/1981 | Duckworth et al. | 318/254 |
| 4,282,471 | 8/1981 | Budniak et al. | 318/685 |
| 4,292,573 | 9/1981 | Ebert et al. | 318/254 X |
| 4,317,072 | 2/1982 | Goof et al. | 318/254 X |
| 4,327,302 | 4/1982 | Herschberger | 310/156 |
| 4,346,434 | 8/1982 | Morinaga | 364/183 |
| 4,368,411 | 1/1983 | Kidd | 318/254 |
| 4,390,826 | 6/1983 | Erdman et al. | 318/439 |
| 4,403,177 | 9/1983 | Weber et al. | 318/254 |
| 4,409,526 | 10/1983 | Yamauchi et al. | 318/138 X |
| 4,415,844 | 11/1983 | Mendenhall et al. | 318/254 X |
| 4,429,262 | 1/1984 | Utenick | 318/254 |
| 4,446,406 | 5/1984 | Uzuka | 318/254 |
| 4,449,079 | 5/1984 | Erdman | 318/138 |
| 4,454,458 | 6/1984 | Holland | 318/254 |
| 4,459,519 | 7/1984 | Erdman | 318/254 |
| 4,492,903 | 1/1985 | Knight et al. | 318/254 X |
| 4,494,051 | 1/1985 | Bailey | 318/439 X |
| 4,494,052 | 1/1985 | Kelleher et al. | 318/138 X |
| 4,495,450 | 1/1985 | Tokizaki et al. | 318/138 |
| 4,525,658 | 6/1985 | Yanagida | 318/254 X |
| 4,528,485 | 7/1985 | Boyd, Jr. | 318/254 X |
| 4,528,486 | 7/1985 | Flaig | 318/254 |
| 4,532,459 | 7/1985 | Erdman et al. | 318/138 |

FOREIGN PATENT DOCUMENTS

| 0071941 | 2/1983 | European Pat. Off. | |
| 57-71258 | 5/1982 | Japan . | |
| 58-25038 | 5/1983 | Japan . | |
| 83/00781 | 3/1983 | PCT Int'l Appl. | 318/254 |
| 2119185 | 11/1983 | United Kingdom . | |

Primary Examiner—Jerry Smith
Assistant Examiner—Jon D. Grossman
Attorney, Agent, or Firm—Ralph E. Krisher, Jr.

[57] ABSTRACT

Control system for an electronically commutated motor (ECM). The ECM includes a stationary assembly having a plurality of winding stages adapted to be selectively commutated, and rotatable means associated with the stationary assembly in selective magnetic coupling relation with the winding stages. A digital computer operating under stored program control effects the commutation of the winding stages by selectively supplying power thereto in response to a pattern of control signals leaving at least one of the winding stages unpowered at any one time while the other winding stages are powered.

24 Claims, 24 Drawing Figures

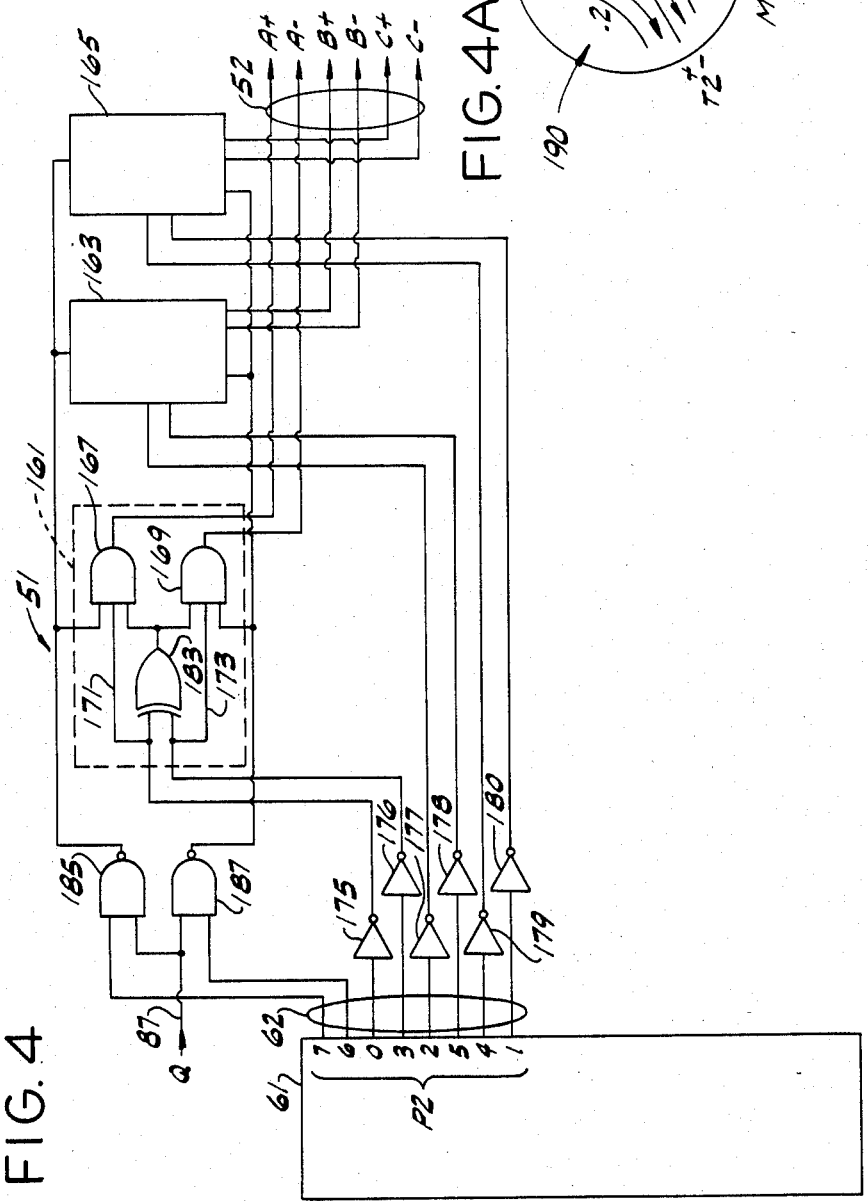

FIG. 4B
| | DIGITAL SIGNAL PATTERN | CONTROL SIGNAL PATTERN |
|---|---|---|
| OFF | 1111111 | 000000 |
| BRAKE | 1001010 | 101010 |
| COMMUTATE | 1011001 | 011000 |
| MONITOR | 0111011 | 001100 |
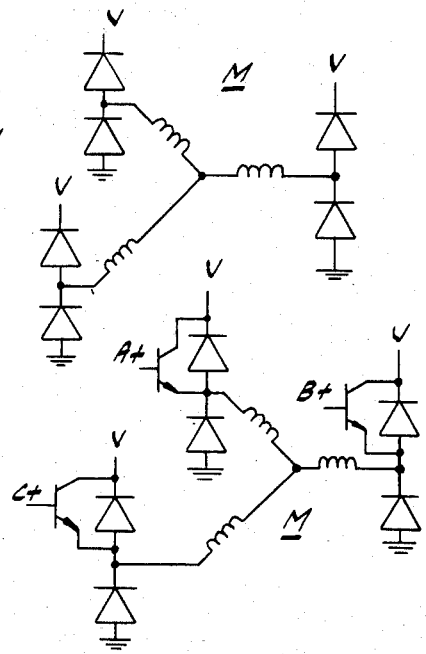
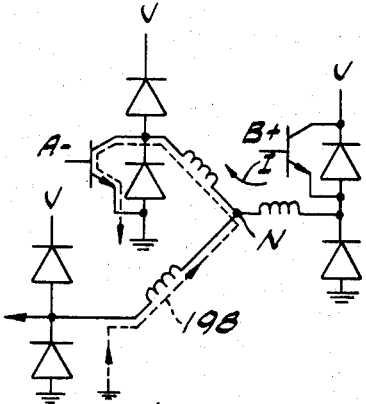
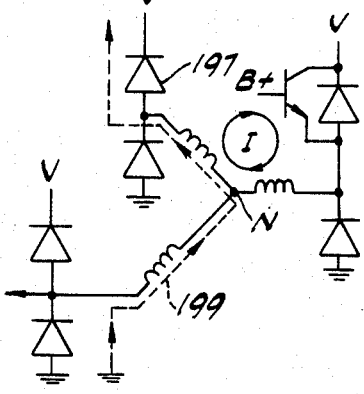

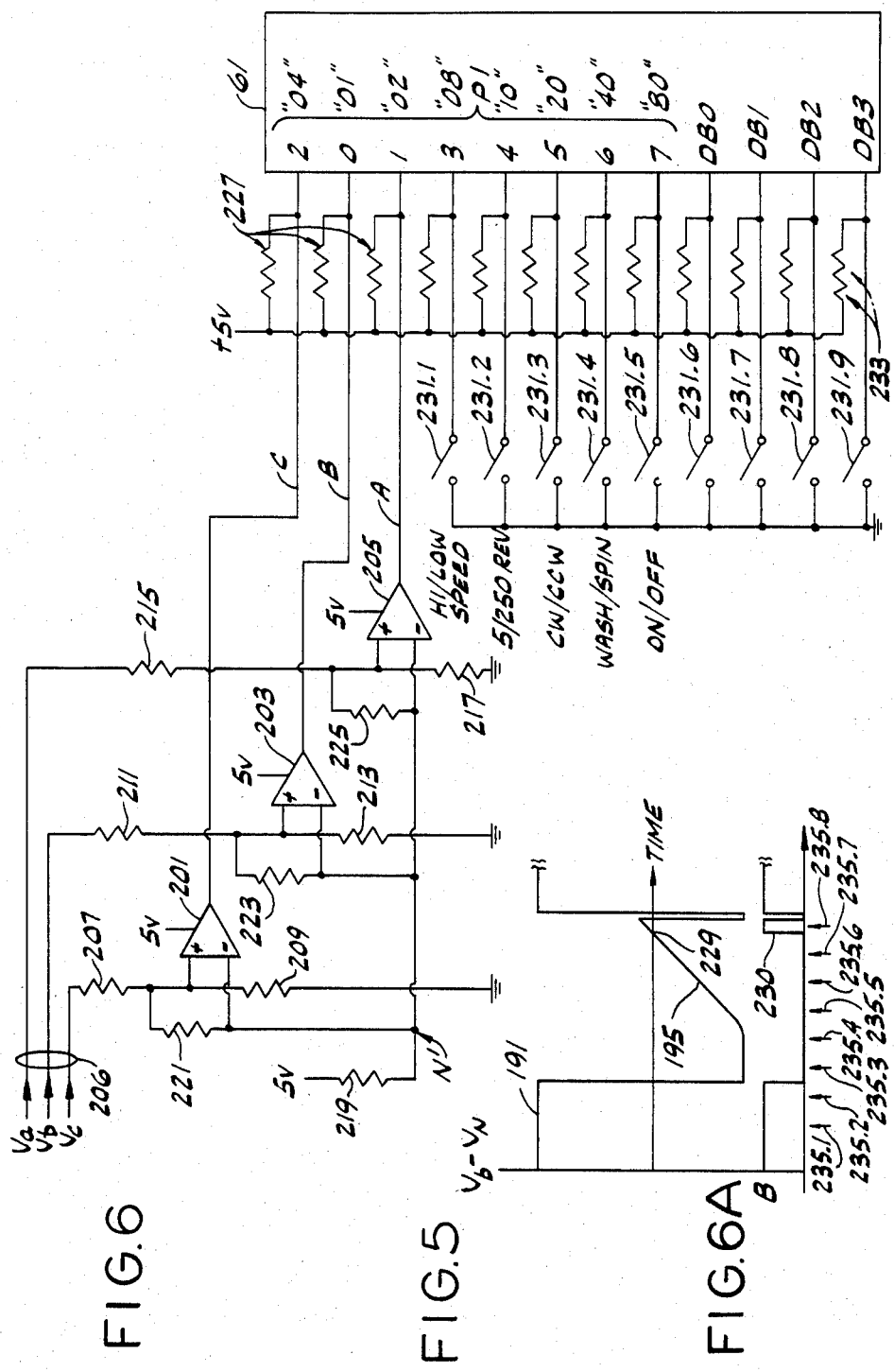

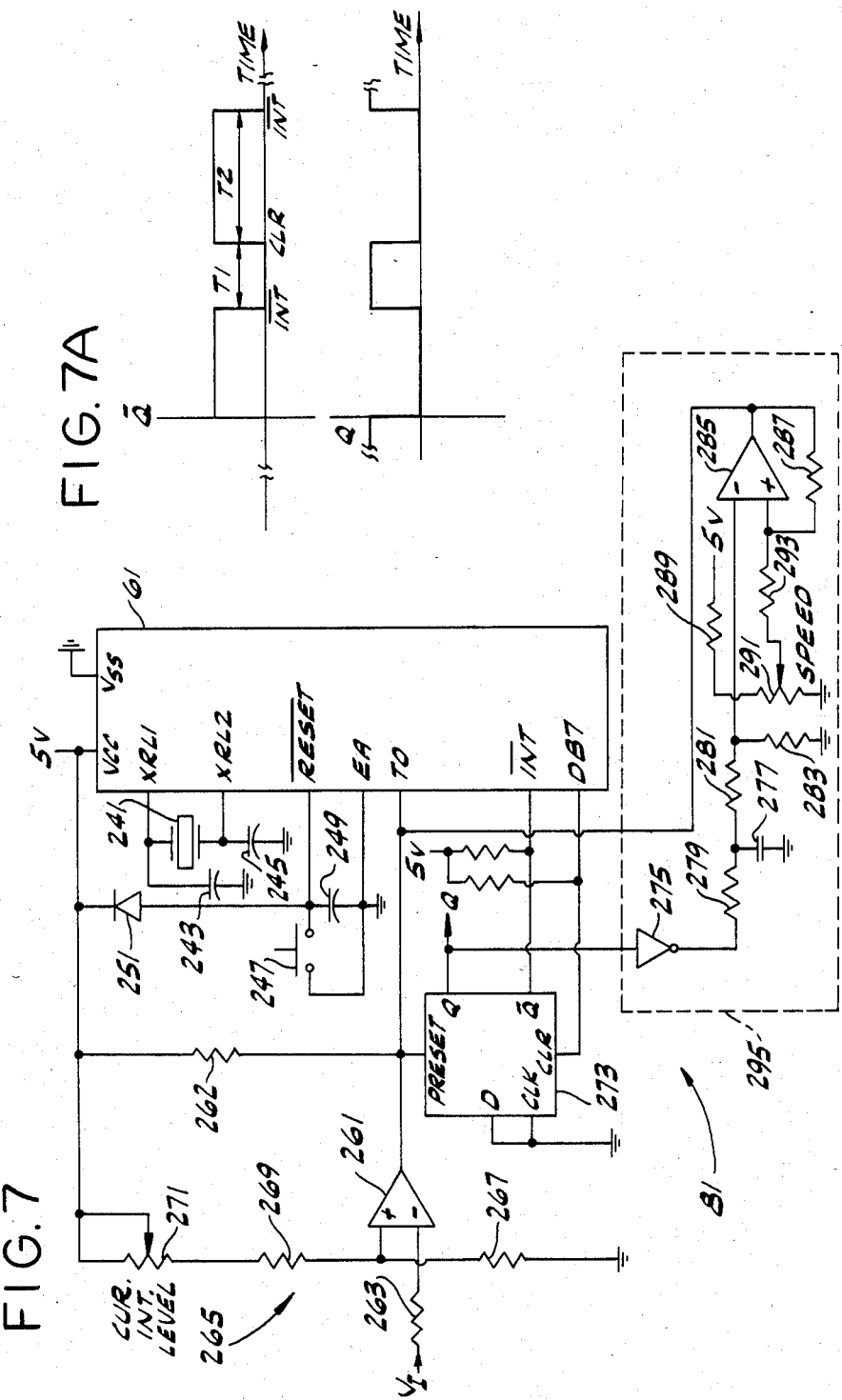

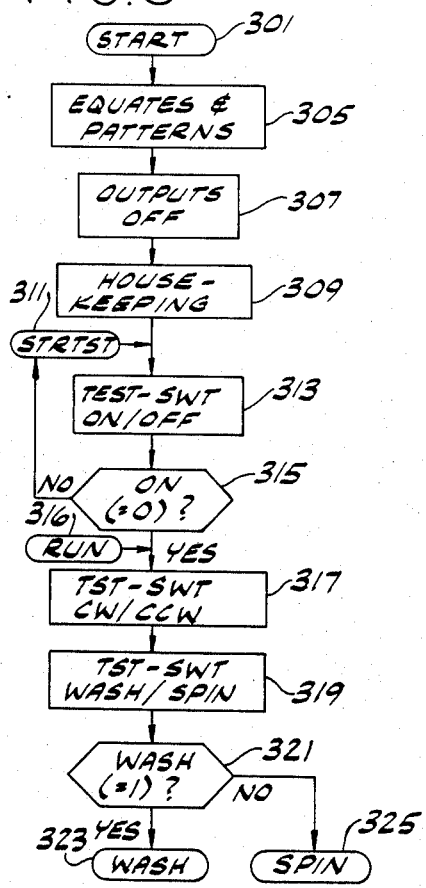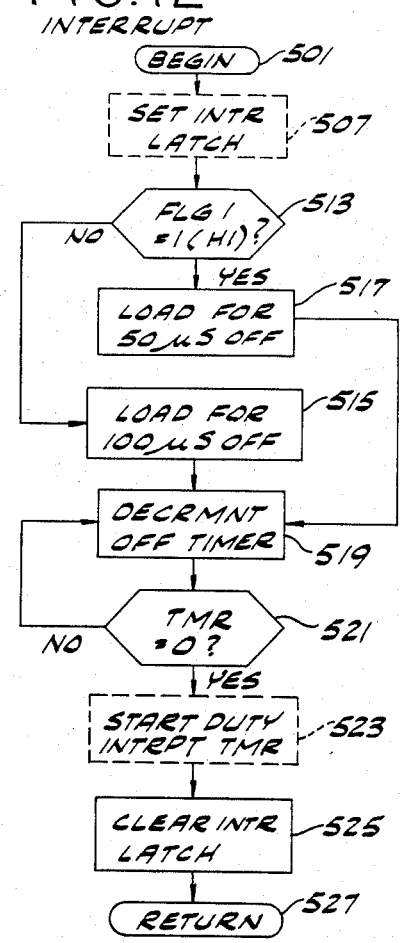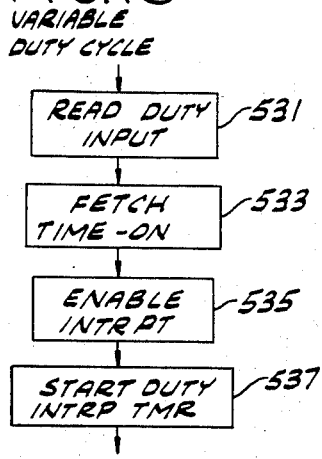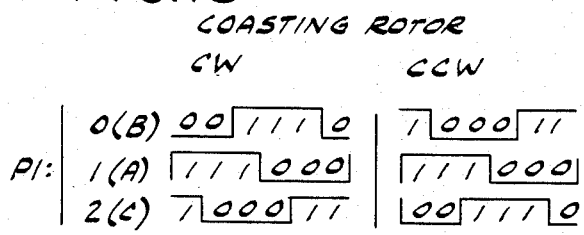

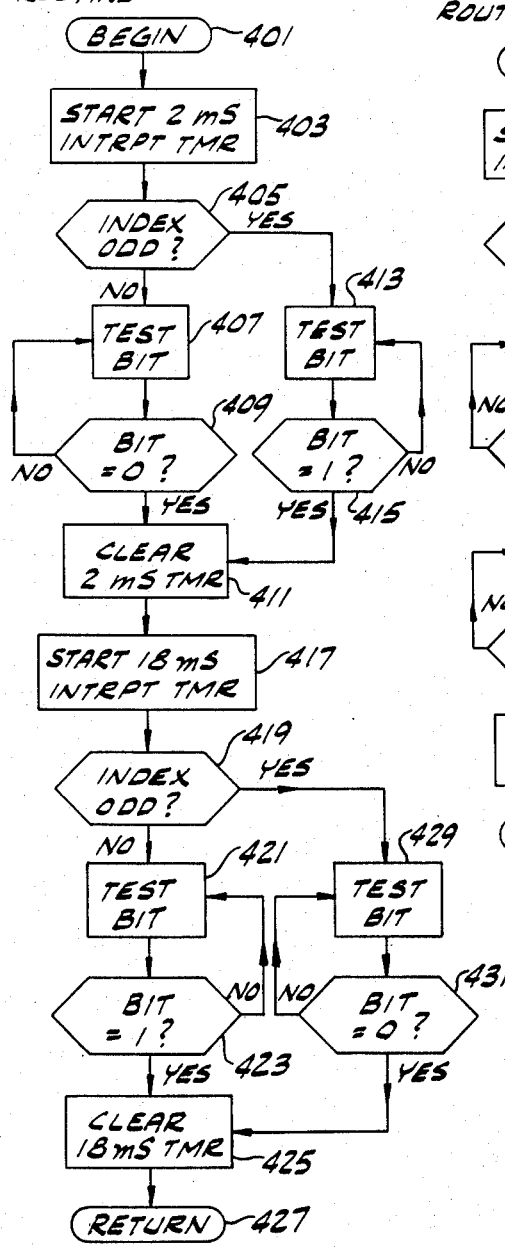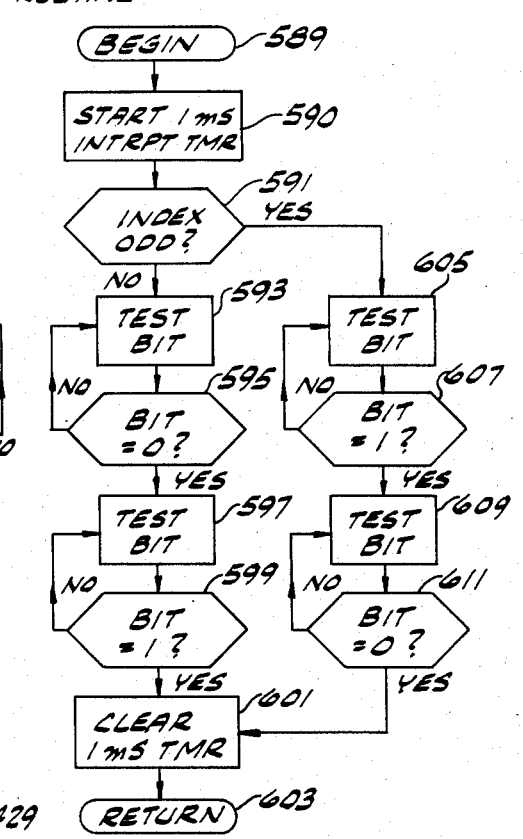

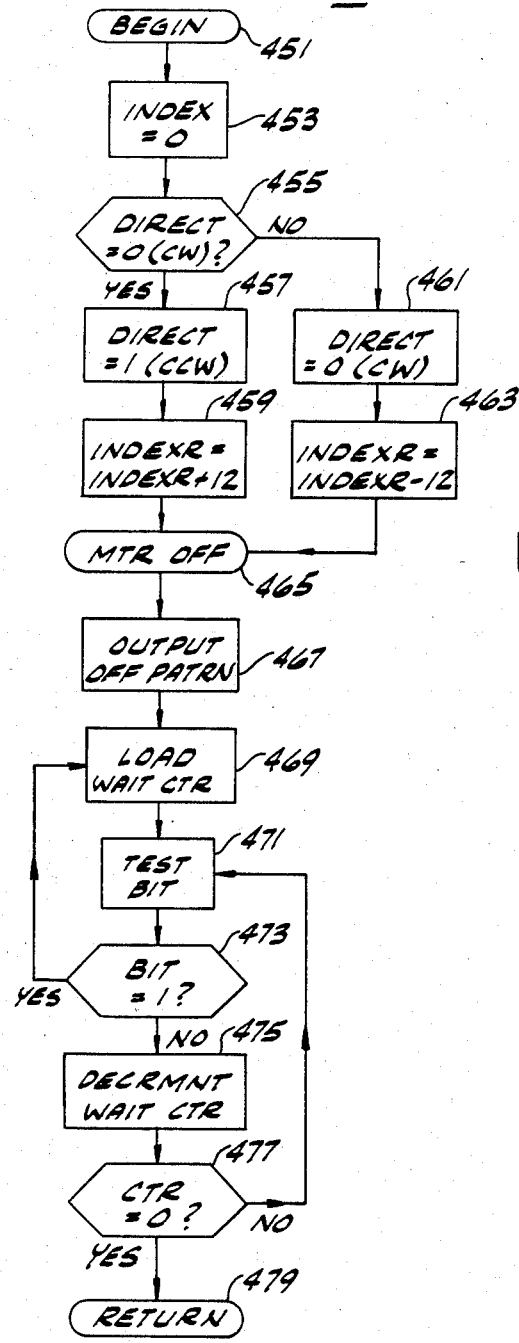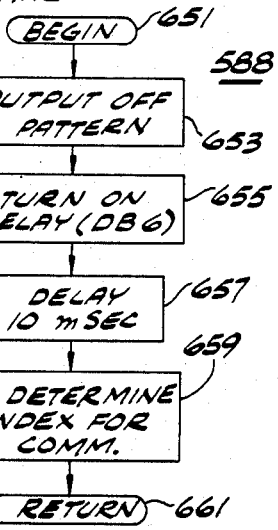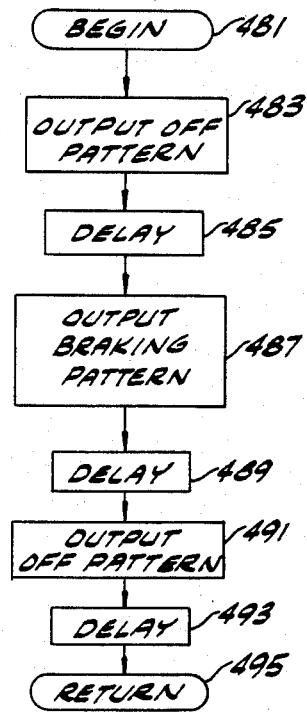

CONTROL SYSTEM FOR AN ELECTRONICALLY COMMUTATED MOTOR

CROSS-REFERENCE TO RELATED APPLICATIONS

This application is a division of the commonly assigned copending parent application Ser. No. 602,163 filed Apr. 19, 1984 now U.S. Pat. No. 4,540,921 and is related to the commonly assigned copending John H. Boyd, Jr. and Alexander Muller application Ser. No. (710,900) filed Mar. 12, 1985 concurrently herewith entitled "Control System For An Electronically Commutated Motor, Method Of Controlling Such And Method of Controlling An Electronically Commutated Motor", and each of such parent and related applications is incorporated herein by reference.

FIELD OF THE INVENTION

This invention relates in general to dynamoelectric machines and domestic appliances and more particularly to control systems with special applicability to electronically commutated motors, electronically commutated motor systems, laundry apparatus and other appliance, and methods for operating them.

BACKGROUND OF THE INVENTION

While conventional brush-commutated DC motors may have numerous advantageous characteristics such as convenience of changing operational speeds and direction of rotation, it is believed that there may be disadvantages, such as brush wear, electrical noise, and radio frequency interference caused by sparking between the brushes and the segmented commutator, that may limit the applicability of such brush-commutated DC motors in some fields such as the domestic appliance field including the laundry apparatus field. Electronically commutated motors, such as brushless DC motors and permanent magnet motors with electronic commutation, have now been developed and generally are believed to have the abovediscussed advantageous characteristics of the brush-commutated DC motors without many of the disadvantages thereof while also having other important advantages. Such electronically commutated motors are disclosed in the David M. Erdman U.S. Pat. Nos. 4,005,347 and 4,169,990 and Floyd H. Wright U.S. Pat. No. 4,162,435, all of which are commonly assigned with the present application and are hereby incorporated by reference. These electronically commutated motors may be advantageously employed in many different fields or motor applications among which are domestic appliances, e.g., automatic washing or laundry machines such as disclosed in commonly assigned, co-pending U.S. patent application Ser. No. 412,421 filed Aug. 27, 1982, now U.S. Pat. No. 4,449,079; Ser. No. 367,951 filed Apr. 13, 1982, now U.S. Pat. No. 4,528,485; Ser. No. 400,319 filed Sept. 25, 1980, now U.S. Pat. No. 4,459,519; Ser. No. 141,268 filed Apr. 17, 1980, now U.S. Pat. No. 4,390,826; Ser. No. 77,784 filed Sept. 21, 1979, now U.S. Pat. No. 4,327,302; and Ser. No. 463,147 filed Feb. 2, 1983.

Laundry machines as disclosed in the above patent applications are believed to have many significant advantages over the prior art laundry machines which employ various types of transmissions and mechanisms to convert rotary motion into oscillatory motion to selectively actuate the machine in its agitation washing mode and in its spin extraction mode. Such prior art laundry machines are believed to be more costly and more complicated to manufacture, consume more energy, and require more servicing. Laundry machines with electronically commutated motors require no mechanical means, other than mere speed reducing means, to effect oscillatory action of the agitator or tumbler, and in some applications, it is believed that the spin basket might be directly driven by such a motor. While the past control systems, such as those disclosed in the aforementioned coassigned applications for instance, undoubtedly illustrated many features, it is believed that the control systems for electronically commutated motors in general, and for such motors utilized in laundry machines, could be improved, as well as the methods of control utilized therein.

In some of the known control systems, the position of the rotatable assembly (i.e., the rotor) of the electronically commutated motor was located by sensing the back emf of one of the winding stages on the stationary assembly (i.e., the stator) thereof. More particularly the back emf of an unenergized winding stage was sensed and integrated to determine rotor position during any one commutation period in a sequence of commutation. With the advent of inexpensive microprocessor chips, controlling an electronically commutated motor with a microprocessor and discrete element control system has been described. Coassigned U.S. Pat. No. 4,250,544, "Combination Microprocessor and Discrete Element Control System for a Clock Rate Controlled Electronically Commutated Motor" issued Feb. 10, 1981, to R. P. Alley discloses such an arrangement and is hereby incorporated by reference. It is believed that further improvements and other departures can be made in methods and systems for controlling electronically commutated motors and for domestic appliance applications including laundering apparatus applications.

SUMMARY OF THE INVENTION

Among the objects of the present invention are to provide an, improved control system for an electronically commutated motor; to provide such improved control system which can screen out unexpected or accidentally produced signals and transients from a microprocessor digital computer to maintain proper operation of the system and the motor; to provide such improved control system which can reliably start an electronically commutated motor and insure its operation in a selected direction of rotation; to provide such improved control system which protects the motor from excessive current; to provide such improved control system which controls the speed of the motor adjustably; to provide such improved control system which senses the rotor position from the back emfs of the winding stages when the rotor is coasting and there are no commutation periods; to provide such improved control system which is resistant to error in determining the rotor position from the back emfs of the winding stages when the rotor is coasting and there are no commutation periods; to provide such improved control system which can commutate an electronically commutated motor in a preselected sequence, discontinue the commutating, and then resume commutating at a proper point in the sequence to keep the motor running smoothly determined from the back emfs of the winding stages when the commutating was discontinued; to provide such improved control system which can accelerate the motor in a low speed connection arrangement of the winding stages, change from the low speed connection arrangement to a higher speed connection arrangement of the winding stages and sense the rotor position to smoothly resume accelerating the motor in the high speed connection arrangement; to provide such improved control systems for an electronically commutated motor, electronically commutated motor system which brakes the motor; to provide such improved control system which smoothly and rapidly reverses the motor; to provide such improved control system which periodically reverses the motor; and to provide such improved control system which powers at least some of the winding stages and rotates the rotor, and then leaves all the winding stages temporarily unpowered and provides a current path for the previously powered winding stages to facilitate rotor position monitoring and accomplish other purposes.

Other objects and features will be in part apparent and in part pointed out hereinafter.

In general and in one form of the invention, a control system is provided for an electronically commutated motor which includes a stationary assembly having a plurality of winding stages adapted to be selectively commutated and rotatable means associated with the stationary assembly is selective magnetic coupling relation with the winding stages, and means is provided for commutating the winding stages by selectively supplying power thereto in response to a pattern of control signals leaving at least one of the winding stages unpowered at any one time while the other winding stages are powered. The control system comprises means coupled to the winding stages for digtizing the voltages across the winding stages and means responsive to successive patterns of digital signals for generating successive patterns of the control signals for the commutating means. A digital computer operating under stored program control has inputs for the digitized voltages. The computer has memory elements for storing data representing at least one preselected sequence of the patterns of the digital signals and for storing data, corresponding to each pattern of the digital signals, identifying the respective input for the digitized voltage for the at least one unpowered winding stage. The computer successively produces one of the patterns of the digital signals, senses only the digitized voltage at the identified input corresponding to the one pattern and produces the following pattern in sequence after at least one predetermined logic level of the digitized voltage at the identified input has occurred.

BRIEF DESCRIPTION OF THE DRAWINGS

FIG. 4 is a schematic diagram of the control signal generator with the microcomputer of FIG. 1;

FIG. 4A is a diagram of current flowing in the motor as a result of commutation in a preselected sequence;

FIG. 4B is four schematic diagrams of circuits effectively resulting in the commutating circuit of FIG. 1 from different digital signal patterns and corresponding control signal patterns produced in accordance with the invention;

FIG. 5 is a voltage versus time diagram of a waveform of voltage across an unpowered winding stage of the motor during a commutation period;

FIG. 6 is a schematic diagram of the voltage digitizing circuit and of switches for providing commands to the microcomputer of FIG. 1 according to the invention;

FIG. 6A is a voltage versus time diagram of a digitized voltage to which the voltage of FIG. 5 is converted in accordance with the invention;

FIG. 7 is a schematic diagram of the current interrupt and speed controlling circuit of FIG. 1 in accordance with the invention;

FIG. 7A is a voltage versus time diagram of outputs Q and Q-bar of a latch or flipflop in the circuit of FIG. 7 for interrupting the microcimputer and causing the control signal generator of FIG. 1 to generate a pattern of control signals to reduce the current flowing in the winding stages of the motor;

FIG. 8 is part of a flow diagram of operations of the microcomputer of FIG. 1 in accordance with the invention;

FIG. 10 is a flow diagram of operations performed by the microcomputer of FIG. 1 in accordance with the invention in a low speed back emf routine of FIG. 9;

FIG. 11 is a flow diagram of operations performed by the microcomputer of FIG. 1 in accordance with the invention in a reversing routine of FIG. 9;

FIG. 11A is a flow diagram of operations performed by the microcomputer of FIG. 1 in accordance with the invention for braking the motor as during a reversing routine;

FIG. 12 is a flow diagram of operations performed by the microcomputer of FIG. 1 in accordance with the invention upon interruption by output Q-bar of FIG. 7A;

FIG. 13 is a flow diagram of operations performed by the microcomputer of FIG. 1 in accordance with the invention for varying a duty cycle for the circuit of FIG. 7;

FIG. 15 is a flow diagram of operations performed by the microcomputer of FIG. 1 in accordance with the invention in a high speed back emf routine of FIG. 14;

FIG. 17 is a flow diagram of operations performed by the microcomputer of FIG. 1 in accordance with the invention in a relaying routine of FIG. 14;

FIG. 18 shows voltage versus time diagrams of waveforms of the digitized voltages of all of the winding stages when the rotor of the motor is coasting clockwise or counterclockwise as during the relaying routine of FIG. 17.

Corresponding reference characters refer to corresponding parts throughout the several views of the drawings.

The exemplifications set out herein illustrate preferred embodiments of the invention in one form thereof, such exemplifications are not to be construed as limiting the scope of the invention in any manner.

DETAILED DESCRIPTION OF PREFERRED EMBODIMENTS

Figure 1:
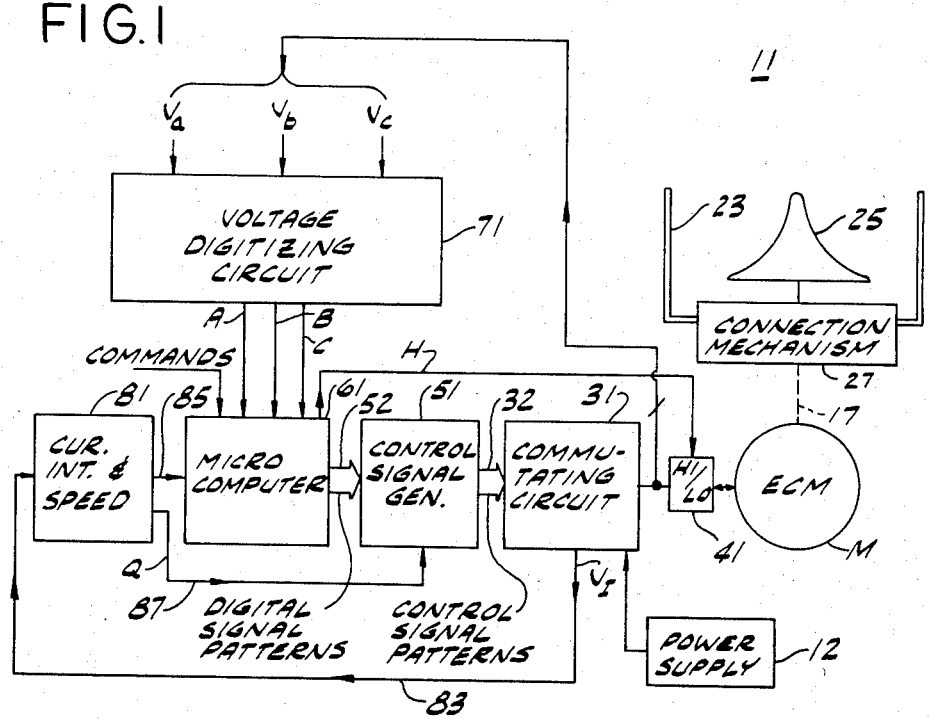
FIG. 1 is a block diagram showing a control system having a high-low speed switching circuit, a commutating circuit, a power supply, a control signal generator, a microcomputer, a voltage digitizing circuit, and a current interrupt and speed controlling circuit with an electronically commutated motor in a laundry machine according to the invention.
Figure 2:
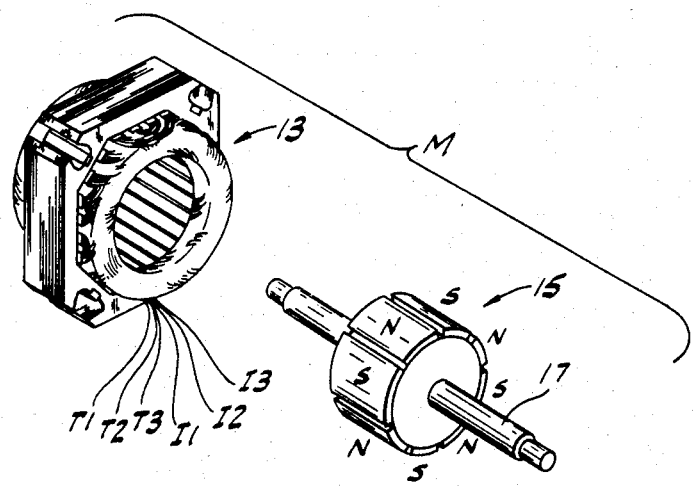
FIG. 2. is an exploded, perspective view of the main elements of an electronically commutated DC motor which is controllable by the control system of FIG. 1.
Figure 3:
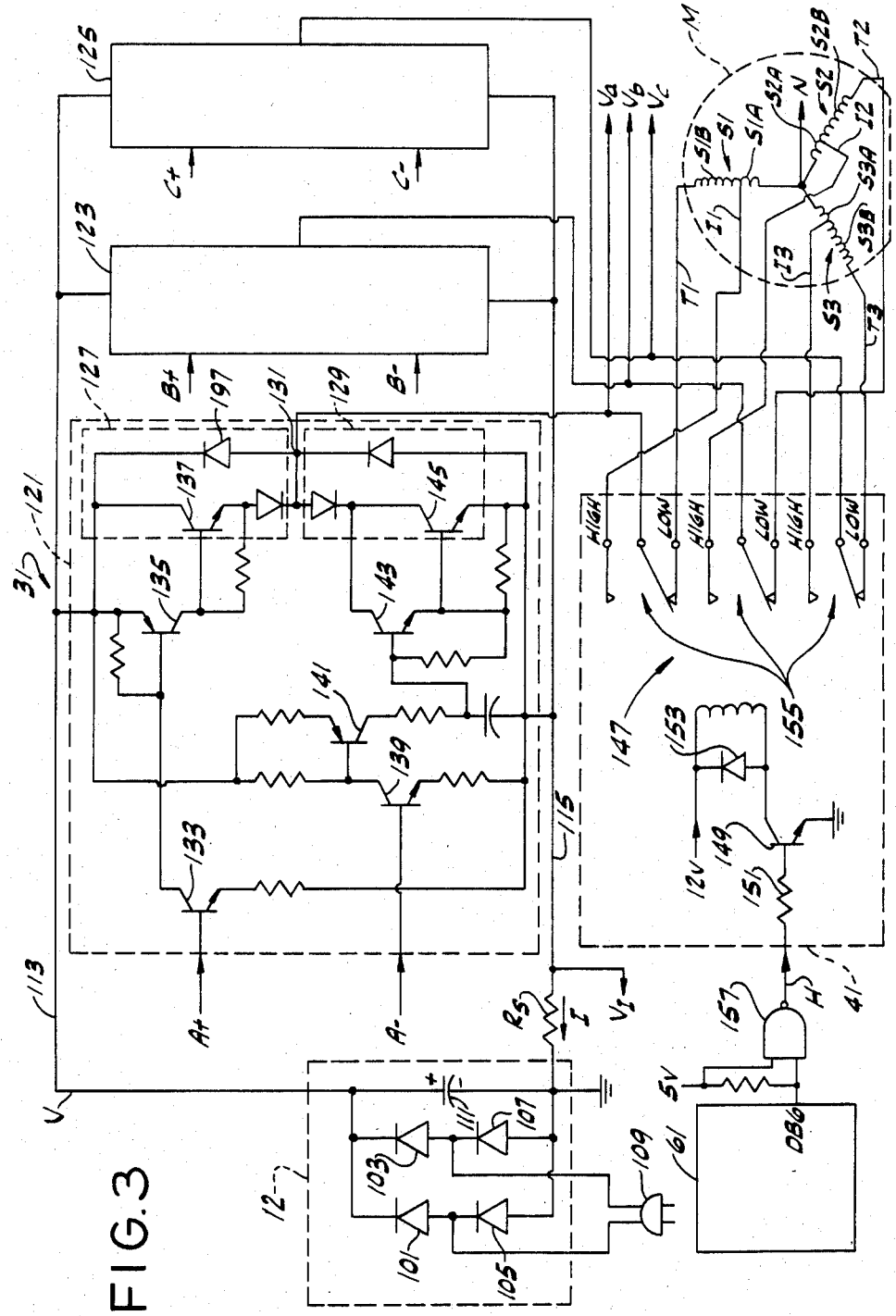
FIG. 3 is a schematic diagram of the high-low speed switching circuit, the commutating circuit, the power supply and the motor of FIG. 1.

Referring now to the drawings, and more particularly to FIG. 1, a laundry apparatus 11 includes an electronically commutated motor (ECM) M adapted to be energized from a DC power supply 12 and having (see FIG. 2) a stationary assembly including a stator 13 and a rotatable assembly including a permanent magnet rotor 15 and a shaft 17. Stator 13 includes a plurality (e.g., three) of winding stages S1, S2 and S3 (FIG. 3). Winding stages S1, S2 and S3 have coil sets or sections S1A and S1B, S2A and S2B, and S3A and S3B respectively. Winding stages S1, S2 and S3 are adapted to be electronically commutated in at least one preselected sequence. Each winding stage has an end terminal T1, T2, and T3, respectively, and an intermediate tap I1, I2, and I3, respectively. The winding stages S1, S2, and S3 are adapted to be electronically commutated at end terminals T1, T2, and T3, so that both coil sets or sections in each winding stage are commutated, for turning the rotor 15 at a low speed. It is noted that sections S1A, S2A, and S3A define tapped sections of the winding stages which are adapted to be electronically commutated at intermediate taps I1, I2, and I3 respectively for turning rotor 15 at a higher speed. When the winding stages S1, S2, and S3 are energized or powered in a temporal sequence, three sets of eight magnetic poles are established that provide a radial magnetic field that moves clockwise or counterclockwise around the bore of stator 13 depending on the preselected sequence or order in which the stages are powered. This moving field intersects with the flux field of the permanent magnet rotor to cause the rotor 15 to rotate relative to the stator 13 in the desired direction to develop a torque which is a direct function of the intensities or strengths of the magnetic fields. If a more detailed description of the construction of electronically commutated motor M is desired, reference may be had to the aforementioned application Ser. No. 367,951 filed Apr. 13, 1982 to John H. Boyd, Jr. which is incorporated herein by reference.

ECM M thus constitutes an electronically commutated motor including a stationary assembly having a plurality of winding stages adapted to be selectively commutated, and rotatable means associated with the stationary assembly in selective magnetic coupling relation with the winding stages. Further, while electronically commutated motor M is illustrated herein for purposes of disclosure, it is contemplated that other such motors of different constructions, having 2, 4, 6, etc. poles and having 2, 3, 4 or more winding stages and/or different winding arrangements may be utilized in one or another form of the invention so as to meet at least some of the objects thereof.

The winding stages of motor M as explained for instance in the aforementioned Alley U.S. Pat. No. 4,250,544 are commutated without brushes by sensing the rotational position of the rotatable assembly or rotor 15 as it rotates within the bore of stator 13 and utilizing electrical signals generated as a function of the rotational position of the rotor to sequentially apply a DC voltage to each of the winding stages in different preselected orders or sequences that determine the direction of the rotation of the rotor. Position sensing may be accomplished by a position detecting circuit responsive to the back emf of the ECM to provide a simulated signal indicative of the rotational position of the ECM rotor to control the timed sequential application of voltage to the winding stages of the motor.

Referring back to FIG. 1, laundry apparatus 11 also has a basket 23 which is rotatable within a tub (not shown) which holds the water for washing the fabrics to be laundered, and a coaxially mounted agitator 25, both of which are rotatable independently or jointly about their common axis. Agitator 25 and basket 23 together comprise means operable generally in a washing mode for agitating water and fabrics to be laundered therein and operable generally in a spin mode for thereafter spinning the fabrics to effect centrifugal displacement of water from the fabrics. However, it is contemplated that such means may also include only a basket which is mounted on a horizontal or inclined axis and there is no separate finned agitator but the basket is operated in an oscillatory mode to agitate the wash water and fabrics to launder them. Upon the commutation of the winding stages, the rotatable assembly of motor M drives the agitating and spinning means and is coupled selectively to the agitator along during the washing mode operation and to both the basket and the agitator in the spin mode operation through a connection mechanism 27 which suitably comprises a fixed ratio speed reducer, such as a gear box or a pulley arrangement, for instance, or in some applications, the shaft 17 of motor M can be directly coupled to the agitator and the basket. The rotatable assembly of motor M and any such fixed ratio speed reducer constitute means for driving the agitating and spinning means in the washing mode operation and in the spin mode operation thereof upon the commutation of the winding stages.

Commutating circuit 31 is provided with power from power supply 12 and constitutes means for commutating the winding stages by selectively supplying or switching power thereto in response to a pattern of control signals 32 leaving at least one of the winding stages unpowered at any one time while the other winding stages are powered. Commutating circuit 31 also constitutes means for controlling the application of DC voltage to the winding stages to provide a resultant effective voltage thereto.

A high-low speed switching circuit 41 couples commutating circuit 31 to motor M, and constitutes means operable generally for switching the winding stages from a first connection arrangement (connecting each of winding stages S1, S2, S3 as a whole through terminals T1, T2, and T3 to commutating circuit 31) to a second connection arrangement (connecting the coil sections S1A, S2A, and S3A of the winding stages S1, S2, and S3 through terminals I1, I2, and I3 to commutating circuit 31). In the present embodiment the first connection arrangement is a low speed connection arrangement and the second connection arrangement is a higher speed connection arrangement.

It is to be understood that other connection arrangements involving two or more speeds, or not involving speed considerations at all are contemplated in the practice of the invention for accomplishing the objects thereof. High-low speed switching circuit 41 is responsive to a High on line H for relaying the winding stages from the low speed connection arrangement to the high speed connection arrangement and responsive to a Low on line H for relaying the winding stages from the high speed connection arrangement to the low speed connection arrangement.

Commutating circuit 31 responds to a set of six control signals, collectively designated 32 and individually designated A+, A−, B−, B−, C+, and C−, from a control signal generator 51. Since each of the control signals A+, A−, B+, B−, C+, and C− can be high or low, there are $2^6$ or 64 permutations or patterns of the control signals. Control signal generator 51 constitutes means responsive to successive patterns of digital signals 52 for generating successive patterns of the control signals 32 for the commutating circuit 31.

A microcomputer 61 in FIG. 1 produces successive patterns of the digital signals 52 in at least one preselected sequence, which causes the control signal generator 51 to produce successive patterns of the control signals 32 in the at least one preselected sequence and in turn cause the motor M to be commutated in the at least one preselected sequence by the commutating circuit 31 to make the rotor 15 turn. The direction of rotation which results is clockwise when a first preselected sequence is used, and counterclockwise when a second preselected sequence is used.

In the preferred embodiment disclosed herein, microcomputer 61 is an Intel 8748 microcomputer having 1K bytes of user programmable and erasable read only memory (EPROM), an 8 bit central processing unit (CPU), 27 input/output (I/O) lines, an 8-bit timer counter, reset and interrupt capability, and an on-board oscillator and clock. The instruction set for the 8748 is set forth in *MCS-48(R) Family of Single Chip Microcomputers User's Manual,* Intel Corporation, Santa Clara, Calif., September, 1981, pages 4–5, in addition to other technical information. Since the implementation and use of microcomputers as a general matter is well known to the person skilled in the art, the details of the 8748 are omitted for brevity. The microcomputer 61 is shown as a rectangle in several of the Figures with only those pin designations for the 8748 shown for connections involved in the operations and circuits of any given figure, all other pins in a given figure, being suppressed for clarity. It is to be understood that the 8748 is but one example of a digital computer which can be utilized in the practice of the invention. In addition, it is contemplated that the functions of the microcomputer illustrated in the drawings can be alternatively implemented in the practice of the invention by any appropriate means, including but not limited to digital or analog circuits of a variety of types whether operating from a stored program, utilizing firmware, or being implemented in hardware, in custom or semi-custom integrated circuit form or having discrete components.

A voltage digitizing circuit 71 is coupled to the winding stages and receives their terminal voltages $V_a$, $V_b$, and $V_c$ through high-low speed switching circuit 41 and constitutes means for simultaneously converting the voltages across the winding stages to digital form thereby to digitize the voltages. Digitizing circuit 71 also constitutes means for generating a first logic level when the voltage across a respective winding stage exceeds a predetermined value and a second logic level when the voltage across it falls below the predetermined value, the digital form of the voltage across each respective winding stage comprising the logic levels so generated. Digitizing circuit 71 has outputs A, B, and C which are connected to corresponding inputs of microcomputer 61.

Microcomputer 61 of FIG. 1 constitutes means for producing successive patterns of digital signals in at least one preselected sequence, for selecting the digitized voltage across the at least one unpowered winding stage depending on the digital signal pattern produced, and for producing a following pattern in sequence after at least one predetermined logic level of the selected digitized voltage has occurred. In the preferred embodiment the following pattern in sequence is produced after complementary logic levels of the selected digitized voltage have occurred in a predetermined order depending on the pattern which is being produced. Microcomputer 61 is a digital computer operating under stored program control and having inputs for the digitized voltages on lines A, B, and C. Microcomputer 61 has memory elements for storing data representing at least one preselected sequence of the patterns of the digital signals and for storing data, corresponding to each pattern of the digital signals, identifying the respective input for the digitized voltage for the at least one unpowered winding stage. Microcomputer 61 successively produces one of the patterns of the digital signals, senses only the digitized voltage at the indentified input corresponding to the one pattern and produces the following pattern in sequence after at least one predetermined logic level of the digitized voltage at the identified input has occurred. When the motor M is first being started, there is no back emf to digitize until the rotor 15 begins to rotate. For this reason, microcomputer 61 operates to produce the following pattern in sequence after a predetermined time period if the at least one predetermined logic level of the selected digitized voltage has not occurred during the predetermined time period. Then as soon as the rotor 15 begins to turn, the following pattern is produced in sequence in response to the digitized voltage and the successive patterns are effectively synchronized with the rotor and accelerate the rotor to an operating speed.

Current interrupt and speed controlling circuit 81 compares the current flowing in the other powered winding stages of the electronically commutated motor M with a predetermined level by sensing a voltage $V_I$ proportional to the current on line 83, and upon the level being exceeded, interrupting microcomputer 61 on line 85 and sending a signal Q on line 87 for causing the control signal generator 51 to generate a pattern of control signals 32 to reduce the current.

In FIG. 3 power supply 12 has diodes 101, 103, 105 and 107 connected as a full wave bridge rectifier for 117 volt single phase AC power received at plug 109. Full wave rectified DC is filtered by capacitor 111 and applied as voltage V across first and second conductors 113 and 115 for supplying DC power to commutating circuit 31 and motor M. A voltage drop $V_I$ is developed across shunt resistor $R_S$ proportional to the current from power supply 12 which is flowing in the motor M.

Commutating circuit 31 is composed of three identical switching circuits 121, 123, and 125 which selectively switch the winding stages to supply conductors 113 and 115 leaving at least one of the winding stages unpowered at any one time while the other winding stages are powered. For conciseness only switching circuit 121 is described in further detail.

Switching circuit 121 has a set or pair of series-connected upper and lower electronic devices 127 and 129 connected across the supply conductors 113 and 115. The pair of devices 127 and 129 has a junction point 131 connected through high-low speed switching circuit 41 to winding stage S1 in the connection arrangement selected by high-low speed switching circuit 41. Switching circuits 123 and 125 are respectively connected to winding stages S2 and S3 similarly.

The switching circuits 121, 123, and 125 each constitute sets of electronic devices connected across supply conductors 113 and 115, each set having at least one junction point connected to a respective one of the winding stages. Each of the electronic devices, e.g., 127 and 129, is able to be switched by a corresponding one of the control signals in each pattern of control signals 32. For instance, when control signal A+ is high, transistors 133 and 135 turn on transistor 137 in electronic device 127. When control signal A− is high, transistors 139, 141, and 143 turn on transistor 145 in electronic device 129. When transistor 137 is on in electronic device 127, and a relay 147 in high-low speed switching circuit 41 is set as shown in FIG. 3, then winding stage S1 terminal T1 is effectively switched to supply conductor 113. When transistor 137 is off in electronic device 127 and transistor 145 is on in electronic device 129, winding stage S1 terminal T1 is switched to supply conductor 115.

It is evident that when a control signal A+, B+, or C+ is High, a corresponding winding stage S1, S2, or S3 is switched to supply conductor 113, and when a control signal A−, B−, or C− is High, a corresponding winding stage S1, S2, or S3 is switched to supply conductor 115.

Relay 147 in High-low speed switching circuit 41 has three-pole-double-throw (3PDT) contacts for electrically substituting sections S1A, S2A, and S3A of the winding stages S1, S2, and S3 in place of the winding as a whole. The winding stages are connected together at neutral N. Relay 147 is driven by transistor 149. Transistor 149 is protected by base resistor 151 and freewheeling diode 153. When a High appears on line H, transistor 149 conducts, closing relay 147 and moving relay armature 155 upward from the Low Speed position shown to a High Speed position, which accomplishes the substitution of the high speed winding sections S1A, S2A, S3A in place of the winding stages S1, S2, S3 and thereby selectively electrically energizes at least one of the winding sections S1A, S2A, S3A of each winding stage S1, S2, S3 to effect commutation. When relaying from low to high speed is to occur, microcomputer 61 outputs a Low on line DB6, which is inverted by NAND-gate 157 and fed as the High on line H.

Lines marked for voltages $V_a$, $V_b$, and $V_c$ are connected to relay armature 155 to allow sensing of voltages on terminals T1, T2, T3 or I1, I2, I3 for each winding stage as selected by relay 147. The $V_a$, $V_b$, $V_c$ lines are connected to the voltage digitizing circuit 71 as shown in FIG. 1.

In FIG. 4, control signal generator 51 generates successive patterns of highs and lows for control signals 52 on the lines respectively marked for each control signal A+,A−,B+,B−,C+, and C− which are fed to the correspondingly marked inputs of commutating circuit 31 of FIG. 3. The successive patterns of the control signals are produced in response to successive patterns of digital signals produced by microcomputer 61 on lines 62.

Control signal generator 51 acts in the preferred embodiment as a protective device and switching means for pulse width modulation. If a pair of the control signals having the same letter designation, such as A+ and A−, were both high simultaneously, electronic devices 127 and 129 of FIG. 3 could short the supply conductors 113 and 115. Microcomputer 61 is capable of producing patterns of digital signals at extremely high rates, and an undesired pattern of control signals such as A+,A− high should not be permitted to occur over an extended period of operation. Control signal generator 51 is hardwired logic circuitry which constitutes means for preventing control signal patterns such as A+,A− high from being generated regardless of the patterns of digital signals produced by microcomputer 61.

Control signal generator 51 has three identical protective circuits 161, 163, and 165. For conciseness, only protective circuit 161 is described in detail. Protective circuit 161 has first and second AND-gates 167 and 169 feeding control signals A+ and A− to the sets of electronic devices 127 and 129. AND-gates 167 and 169 have inputs 171 and 173 driven by a respective pair of digital signals through inverting buffers 175 and 176 from port P2 lines 0 and 3 from microcomputer 61. Corresponding AND-gates in protective circuits 163 and 165 respectively feed control signals B+, B− and C+, C− to switching circuits 123 and 125 in FIG. 3. These corresponding AND-gates in protective circuits 163 and 165 have their own inputs driven by digital signal pairs through inverting buffers 177,178 (port P2 lines 2 and 5) and inverting buffers 179,180 (port P2, lines 4 and 1) respectively.

Exclusive-OR gate 183 has inputs connected to the inputs of AND-gates 167 and 169 driven by a pair of the digital signals. Exclusive-OR gate 183 has its output feeding both AND-gates 167 and 169 for disabling them when the pair of digital signals on lines 0 and 3 of port P2 have identical logic levels in the pair. Exclusive-OR gates corresponding to gate 183 in protective circuits 163 and 165 are identically wired so that no pair of the control signals 52 having the same letter designation can become high simultaneously. In this way the contingency of control signals occurring which could short the power supply is prevented, and reliability is enhanced.

Control signal generator 51 thus constitutes means for preventing at least one pattern of control signals 52 from being generated regardless of the patterns of digital signals on lines 62 produced by microcomputer 61.

Microcomputer 61 produces an additional pair of digital signals, which are different in logic level from each other, on lines 7 and 6 of port P2 which respectively feed NAND gates 185 and 187. A disabling input Q on line 87 is provided to both NAND gates 185 and 187 when power is to be removed from the winding stages. In this way NAND-gates 185 and 187 constitute means for disabling in response to disabling signal Q a single one of the NAND-gates 167 and 169 in each of the protective circuits 161, 163, and 165. The NAND-gate 167 or 169 to be disabled in each protective circuit is effectively identified by the additional pair of digital signals on lines 7 and 6.

The control signal patterns during commutation are normally the logical complements of the digital signal patterns on lines 0-5 from port P2. FIG. 4A illustrates currents 190 being caused to flow in motor M in the low speed connection arrangement in a preselected sequence 190.0, 190.1, 190.2, 190.3, 190.4, 190.5 in response to successive patterns of the control signals 52. Terminals T1, T2, and T3 of motor M are selectively switched to "+" supply conductor 113 of FIG. 3 and to "−" supply conductor 115 depending on the direction of desired current flow indicated by the current arrows in FIG. 4A. For instance, the first current 190.0 in the sequence is to flow inside motor M from terminal T1 to terminal T3. Terminal T1 is switched to "+" conductor 113 by A+ high, and terminal T3 is switched to "−" conductor 115 by C− high. Next, current 190.1 is produced by keeping C− high, returning A+ low to disconnect terminal T1, and bringing B+ high to connect terminal T2 to "+" conductor 113. Next, current 190.2 is produced by keeping B+ high, returning C− low, to disconnect terminal T3, and bringing A− high to connect terminal T1 to "−" conductor 115. The sequence is continued to produce currents 190.3, 190.4, and 190.5 and then repeated beginning with current 190.0 again. It is seen that during commutation at least one of the winding stages is unpowered at any one time while the other winding stages are powered by application of the current in sequence through selective switching.

Table I has columns corresponding to each point or current step in the preselected sequence just described above. Currents 190.0-190.5 in FIG. 4A correspond to the columns of control signals shown in Table I in order from left to right and indexed from 0 through 5 therein. The control signals result in clockwise rotation of the rotatable assembly of motor M when applied in the preselected sequence of Table I. Counterclockwise rotation is obtained by applying the control signals in a second preselected sequence shown in Table II which is the reverse of the sequence of Table I. The column entries for the control signals of Table II are seen to be the same when read from right to left as the column entries of Table I read from left to right.

In FIG. 4 the control signals 52 are normally the complement of the digital signals on lines 0-5 of port P2 of the microcomputer 61. Tables I and II summarize the relationship of the digital signals to the control signals in each column. The first eight rows of each Table show the outputs for each digital signal pattern in sequence from each P2 port line from 7 down to zero. It is seen that in lines 5 through zero there are exactly two lines in any one column which are logic zero, or low. For example, in the left-most column in the sequence in Table I, these two lines are lines 1 and 0. By inspection of FIG. 4, lows on lines 1 and 0 are inverted by inverting buffers 175 and 180 and bring control signals A+ and C− high through protective circuits 161 and 165. Table I, leftmost column, also shows control signals A+ and C− tabulated at this point in the sequence. Comparison of the rest of the columns of Tables I and II with FIG. 4A demonstrates the preselected sequences of digital signal patterns correlated with control signal patterns for clockwise and counterclockwise rotation.

The digital signal patterns and control signal patterns are here recognized as signifying directives produced by microcomputer 61 and control signal generator 51 for motor M. The directives are not only used for commutation in clockwise and counterclockwise directions but for other operations of motor M.

FIG. 4B illustrates interpretations of some of the digital and control signal patterns by showing corresponding equivalent circuits in the electronic devices 127 and 129 of switching circuits 121, 123, and 125 of FIG. 3.

When microcomputer 61 produces all ones on lines 0 through 7, (11111111 binary which is FF hexadecimal), a control signal pattern consisting of all Lows is generated by control signal generator 51. Commutating circuit 31 has transistors 137 and 145 off in each switching circuit 121, 123, and 125 and motor M is turned off. Only freewheeling diodes, such as diode 197 in electronic device 127 and its counterpart in electronic device 129 of FIG. 3, appear as shown in FIG. 4B in the equivalent circuit.

The motor M is effectively braked when the rotor is spinning, by connecting all of the winding stages together. In FIG. 4B this is accomplished by bringing A+, B+, and C+ high, corresponding to control signals 101010 and digital signals 10010101. The electronic device 127 in FIG. 3 in each of switching circuits 121, 123, and 125 becomes conductive and the winding stages of motor M are all tied to the positive supply conductor or rail 113. Mechanical energy in motor M is rapidly dissipated, braking the rotatable assembly 15 of FIG. 2. It is to be noted that a complementary braking pattern (not shown) brings A−, B−, and C− high when A+, B+, and C+ are low.

As already discussed in connection with Tables I and II, two of the windings in a wye-connected motor are powered at any one time, leaving the third unpowered, by bringing two control signals high in two of the switching circuits 121, 123, and 125 of FIG. 3. In FIG. 4B, for illustration, control signals B+ and A− are brought high, causing current I to flow from voltage V through an upper transistor turned on by control signal B+ through two winding stages of motor M and to ground through a lower transistor turned on by control signal A−. Different "Commutate" patterns are applied in at least one preselected sequence to rotate the rotatable assembly in a predetermined direction.

When the Commutate patterns are applied, at least one of the winding stages is unpowered in sequence (see FIG. 4B) while the other winding stages are powered in sequence. FIG. 5 illustrates the voltage behavior across an unpowered winding stage from a terminal thereof to neutral N during a commutation period when the other winding stages are powered.

Initially a voltage 191 having a high magnitude occurs because of the collapsing field of the unpowered winding resulting from its having been previously powered in the sequence. Field collapse voltage portion 191 dissipates, revealing a ramp-shaped back emf 195 induced in the winding by virtue of the rotation of rotatable assembly 15. Back emf 195 is useful for position sensing of the rotatable assembly 15, while field collapse voltage 191 is not believed to be so useful for position sensing.

The position of the rotor 15 is able to be monitored as it is coasting, by allowing "half" of an electronic switching device to be connected to "half" a winding stage, by turning off one of the two electronic switching devices which would otherwise be both on. Then the proper pair of electronic switching devices is turned on, as dictated by the present rotor position (and not by the position when the power was turned off), and the ECM M continues normal operation.

In FIG. 4B a pattern herein called a "Monitor" pattern is temporarily applied to eliminate the field collapse voltage 191 and reveal the back emf 195 sooner. A single one of the control signals, e.g., B+, is kept high while a previously high control signal, e.g., A− from the Commutate pattern, is brought low. The current I freewheels through the B+ transistor and diode 197 and the voltage at neutral N rises from about half the supply voltage V to essentially the full supply voltage V. The unpowered winding stage in FIG. 4B has a current flowing therein when the field collapse voltage 191 of FIG. 5 is occurring. When the other winding stages are being powered by the commutating circuit 31 in response to a Commutate pattern of control signals B+ and A− as shown, the unpowered winding stage temporarily has current 198 circulating through the system as shown and transferring energy from its magnetic field to the rest of the system at a moderate rate because the voltage at neutral N is about half of the supply voltage V. When a monitor pattern for a fast rate of energy extraction is applied as shown, for example by turning off control signal A− and thereby removing its transistor from the circuit, the current in the unpowered winding stage, now designated 199, must release its energy into the full voltage of the power supply 12 through diode 197, thereby transferring energy away from the unpowered winding stage at a much faster rate. In this way, temporary application of a monitor pattern as shown in FIG. 4B eliminates the field collapse voltage 191 of FIG. 5 and reveals the back emf 195 sooner.

It is also recognized that a monitor pattern for slow rate of energy extraction exists when control signal A− is kept on and control signal B+ is turned off, thereby removing the B+ transistor and keeping the A− transistor. Then current I freewheels through ground (conductor 115) and the voltage of neutral N is brought near ground potential (not shown in FIG. 4B), resulting in a relatively slow rate of energy extraction for current 198. Since in some of the contemplated application of the invention, the control signals such as A− or B+, are pulse width modulated as a result of the disabling signal Q of FIG. 4 or by means of microcomputer 61 directly, the rate of energy extraction is of interest and can be chosen, for instance, between fast and slow by the proper selection of the monitor patterns for achieving at least some of the objects of the invention.

It is contemplated that the various digital signal patterns and control signal patterns be applied as directives to an electronically commutated motor M in any sequence or order, so as to accomplish at least some of the objects of the invention.

The voltage behavior (see FIG. 5) across the unpowered winding stage during a commutation period is inverted in polarity compared to the voltage across the winding stage which was unpowered in the next previous commutation period. Accordingly, FIG. 5 shows but one example of voltage behavior across an unpowered winding stage, and it is to be noted that the back emf 195 approaches the zero level from opposite directions in successive commutation periods. In other words, in one commutation period the back emf 195 ramps up as shown, and in the next commutation period the back emf 195 ramps down with inverted polarity compared to FIG. 5.

In FIG. 3, terminal voltages $V_a$, $V_b$, and $V_c$ for the winding stage terminals selected by relay 147 are all available. Microcomputer 61 automatically and correctly selects the voltage for the unpowered winding stage by looking up an identification corresponding to the unpowered winding stage in a table relating the point in the sequence of commutation to the identification of the unpowered winding stage. The relationship, or function, is different for clockwise and counterclockwise rotation.

In a further feature the voltages across the winding stages are simultaneously converted by circuit 71 to digital form thereby to digitize the voltages. As shown in FIG. 6, the digitizing is accomplished with the use of voltage comparators 201, 203, and 205. Comparators 201, 203, and 205 each have noninverting (+) and inverting (−) input terminals for accepting signals to be compared, and when one signal falls below the other at a given comparator, the output of the respective comparator changes state. The noninverting input terminals of the comparators 201, 203, and 205 are respectively coupled by three voltage dividers having resistors 207,209; 211,213; and 215,217 to the the respective winding stages via the lines 206 bearing terminal voltages $V_c$, $V_b$, and $V_a$. The voltage dividers are equal in their voltage division ratio. The inverting input terminals of the comparators are coupled by direct connection to a network of resistors 219, 221, 223, 225 for synthesizing a neutral N′ from the voltages available from the voltage dividers having resistors 207,209; 211,213; and 215,217. The resistor network constitutes means for providing a voltage corresponding to the neutral N of the winding stages in FIG. 3. The output terminals C, B, and A of comparators 201, 203, and 205 are respectively coupled to port P1 input lines 2, 0, and 1 of microcomputer 61 and provided with pullup resistors collectively designated 227. It is noted that the neutral N can be directly brought to the circuit of FIG. 5 without use of the resistor network for synthesizing a neutral and that a variety of circuits for digitizing the voltages can be utilized for achieving at least some of the objects of the invention.

Because of the voltage dividers 207,209; 211,213; and 215,217 each comparator 201, 203, and 205 respectively sees at its noninverting input terminal a voltage proportional to a terminal voltage $V_a$, $V_b$, and $V_c$ of a respective winding stage S1, S2, and S3. Each comparator at its inverting input terminal sees the voltage $V_N'$, which is proportional with the same constant of proportionality to the voltage $V_N$ of the neutral N. The constant of proportionality is then effectively disregarded in the comparing process. Each of the comparators generates a first logic level (one) when the voltage $V_a$-$V_N$, $V_b$-$V_N$, or $V_c$-$V_N$ across a respective winding stage exceeds a predetermined value of zero (i.e., when the voltage across a respective winding stage is positive) and generates a second logic level when the voltage across it falls below the predetermined value of zero (i.e. when the voltage across a respective winding stage is negative).

Where it is desired to provide a voltage offset such as by adjustment of the value of resistor 219 or by other means, it is to be understood that the predetermined voltage value departs from zero.

The voltage digitizing circuit of FIGS. 1 and 5 thus constitutes means for providing a voltage corresponding to a neutral for the winding stages and further includes a plurality of comparators each having an output and first and second input terminals, the first input terminals being respectively coupled to the respective winding stages, the second input terminals being coupled to the neutral voltage means, the output terminals being respectively coupled to the inputs of the digital computer (microcomputer 61).

The digital form of the voltage across each respective winding stage comprises the logic levels so generated at outputs C, B, and A. FIG. 6A illustrates a digitized voltage at output B corresponding the analog voltage $V_b$-$V_N$ of FIG. 5. The digitized voltage in FIG. 6A begins high during the field collapse voltage 191, goes low when the field collapse voltage 191 ends, and then goes back high as soon as zero crossing 229 occurs. It is to be understood that in the following commutation period, the voltage behavior shown in FIG. 5 is inverted in polarity, so that the digitized voltage corresponding to FIG. 6A for the unpowered winding in the following commutation period is the logical complement of the pulses shown in FIG. 6A. In either event a transition 230 occurs in the digitized voltage of FIG. 6A substantially simultaneous with zero crossing 229 and corresponding to a specific physical position of the rotatable assembly 15 in relation to the poles of motor M. In the preferred embodiment, the zero crossing 229 is used to trigger the beginning of the next commutation period by causing microcomputer 61 to advance in the sequence of commutation and produce a following pattern of control signals.

Referring again to FIG. 5, microprocessor 61 is provided with a set of switches 231.1–231.9 for providing the Commands indicated in FIG. 1. Switches 231.1–231.9 are provided with pullup resistors collectively designated 233 and are respectively connected to lines 3,4,5,6,7 (in Port P1) and lines DB0, DB1, DB2, and DB3. One or more of switches 231.1–231.9 are incorporated in user-operable mechanisms of any familiar type on laundry apparatus 11 which accomplish laundering of different types of fabrics by washing, rinsing, and spinning the fabrics with different temperatures of water and by executing the various operations of the laundry apparatus for different lengths of time. Switches for operations which are relevant to controlling an electronically commutated motor M in laundry apparatus 11 are discussed below.

ON/OFF switch 231.5 is used to signal microprocessor 61 to tell it whether the laundry apparatus is to be on or off. This switch 231.5 is suitably polled every six commutations, or each revolution of the motor. Reception of a logic 0 at line 7 of port P1 indicates the Off condition. Line 7 is polled continuously when line 7 is low. When line 7 goes high, the microcomputer 61 commences operations to run the motor M.

WASH/SPIN switch 231.4 provides a logic level on line 6 of port P1 by which microcomputer 61 determines whether a washing or spinning mode is called for.

CW/CCW rotational direction switch 231.3 provides a logic level on line 5 of port P1 for setting the direction of rotation of motor M in the SPIN mode. Microprocessor 61 utilizes this direction information in determining whether a preselected sequence of digital signal patterns should be produced for clockwise rotation or another preselected sequence should be produced for counterclockwise rotation. In some embodiments the setting of the CW/CCW switch 231.3 is ignored by microcomputer 61 when the WASH/SPIN switch 231.4 is set to WASH.

5/250 REV switch 231.2 provides a logic level on line 4 of port P1. This switch 231.2 is used when microcomputer 61 counts revolutions of the rotatable means 15 by counting successive patterns of digital signals produced. A revolution counter in microcomputer 61 is set to 5 when the switch 231.2 is set to the "5" position, as for setting the number of revolutions of motor M in a washing mode of a center-post-agitator-type laundry apparatus. When an 8:1 speed reducer is used with motor M, a stroke of agitation of less than one revolution results in the laundry apparatus. The revolution counter is illustratively set to 250 by switch 231.2 for setting the number of revolutions to be similarly reduced in a washing mode of tumbler-type laundry apparatus.

HI/LOW SPEED switch 231.1 is connected to line 3 of port P1, and is usable, for instance, to indicate when microcomputer 61 is to issue a signal on line DB6 for controlling High-low speed switching circuit 41 of FIG. 1.

Switches 231.6, 231.7, 231.8 and 231.9 are able to be utilized for other control functions as desired by the skilled worker. For instance, if the SPIN mode is selected on switch 231.4, these switches are suitably used to provide logic levels on lines DB0–DB3 which determine the maximum speed to which the ECM M accelerates. The motor is caused to accelerate or decelerate to the speed selected at a maximum rate preestablished in memory. A value is suitably selected from a table stored in the microcomputer 61 to determine the desired elapsed time between commutations and therefore the maximum speed. Power to the motor is pulse width modulated with adjustable duty cycle to accelerate as fast as possible without exceeding a maximum motor current level to the selected speed level. Microcomputer 61 can also be programmed to execute dynamic braking to zero motor speed when the lines DB0–DB3 are all low.

In further control functions obtainable with the switches 231.6–231.9, microcomputer 61 interprets any one of 16 possible settings of the four switches as instructions for amplitudes and waveshapes of agitation speed profiles (effective voltage to motor M) or torque profiles (current in motor M) when switch 231.4 is in the WASH position.

In FIG. 6, hexadecimal numbers are set off in quotes and marked inside the rectangle symbolizing microcomputer 61 to identify the lines 0–7 of port 1 when microcomputer 61 selects or "masks" the port to read the logic level on a given one of the lines. It is noted that each of the hexadecimal numbers 01, 02, 04, 08, 10, 20, 40, 80 in binary notation is all zeros except for a "1" in a bit position corresponding to the number of its respective line. When the hexadecimal number is ANDed with the logic levels of the lines in an accumulator register (not shown) of microcomputer 61, only the logic level, if a one (1), of the line signified by the hexadecimal number remains in the accumulator. When it is desired to mask the port for a multiple number of lines such as lines 0, 1, and 2 to determine whether any of the lines is active, the masking number ALLHI=07 (00000111) is ANDed with the logic levels of the lines in the accumulator.

Referring again to Tables I and II, each of the digital signal patterns and control signal patterns in the sequence is identified by values of an index in the row marked INDEX. Another index row is designated INDEXR to correlate with the flow diagrams discussed below in connection with FIGS. 9, 11, 14, 16, and 19. The INDEXR row has entries which are distinct to each pattern in the sequence and different for Table I and Table II, so that a given pattern is uniquely identified for clockwise and counterclockwise rotation.

In Tables I and II, the hexadecimal value for masking port P1 and thereby selecting the digitized voltage across the at least one unpowered winding stage is tabulated in the row "Digitized Voltage Mask." The mask number depends on, and is a function of, INDEX and therefore also depends on and is a function of the digital signal pattern produced by microcomputer 61. The comparator 201, 203, 205 output designation A, B, or C which is selected is also entered for mnemonic purposes in Tables I and II beneath the hexadecimal mask number.

Microcomputer 61 outputs a pattern of digital signals from a column in Table I when clockwise rotation is selected on switch 231.3 of FIG. 6. The next pattern of digital signals is produced by incrementing INDEX after complementary logic levels are sensed on the masked line from the unpowered winding stage. The complementary logic levels which microcomputer 61 seeks depend on the point its operations have reached in the sequence, so the logic levels are tabulated in the row "Test Bit Order" in Table I as a function of INDEX. For example, assume that INDEX is zero, and microcomputer 61 has just produced the digital signal pattern 01111100 causing control signals A+ and C− to go high. Then microcomputer 61 masks port P1 with "01" to obtain only the B output from the comparators corresponding to winding stage S2. As shown in FIG. 6A, microcomputer 61 senses the digitized voltage for that winding stage in repeated operations indicated by arrows 235.1–235.8. (It is to be understood that the arrows do not necessarily correspond in number and spacing to the actual rate of instances of sensing by microcomputer 61 in any particular embodiment.) During the duration of field collapse voltage 191 in FIG. 5, only logic ones are sensed corresponding to arrows 235.1 and 235.2. Since the test bit order in Table I calls for 0,1 the operations continue looking first for the initial zero. At arrow 235.3, the initial zero is found. Now microcomputer 61 looks for the logic level one in the 0,1 test bit order. It continues looking but senses 0 at times indicated by arrows 235.4, 235.5, 235.6 and 235.7. Then at the time indicated by arrow 235.8, just when the back emf 195 has had its zero crossing 229 and transition 230 has occurred in the digitized voltage, microcomputer 61 senses a logic level 1 matching the second entry in the test bit order. The complementary logic levels 0,1 of the selected digitized voltage B have now occurred in the predetermined order. Microcomputer 61 now advances in the sequence of commutation by incrementing INDEX by 1, produces the digital signal pattern 10111001, masks with mask 02 (comparator output A), and advances in sequence after complementary logic levels in the order 1,0 for the digitized voltage A have occurred, indicating another zero crossing.

In FIG. 7, a source of 5 volts DC is connected to positive voltage supply pin $V_{CC}$ of microcomputer 61, and supply return pin $V_{SS}$ is connected to ground. A crystal 241 with associated capacitors 243 and 245 is connected to pins XRL1 and XRL2. The operations of microcomputer 61 are reset by a circuit connecting input RESET-bar to reset switch 247 and capacitor 249 to ground, and RESET-bar is also connected to $V_{CC}$ through reverse-biased diode 251. Pin EA of the 8748 chip is connected to ground. The connections described in this paragraph are conventional and are not described further.

The current interrupt and speed circuit 81 of FIG. 1 is now described in more detail using FIG. 7. Comparator 261 has its inverting input connected through resistor 263 to voltage $V_I$ from shunt resistor $R_S$ of FIG. 3. The noninverting input of comparator 261 is connected to a voltage divider 265 consisting of resistors 267 and 269 and variable resistor 271 for setting a current interrupt level. Adjusting variable resistor 271 sets a predetermined level. Comparator 261 with its pullup resistor 262 compares the current flowing in the powered winding stages of motor M with the predetermined level fed to the noninverting input of comparator 261. Upon the predetermined level being exceeded by voltage $V_I$, the output of comparator 261 goes low at the PRESET input of a 74LS74 flipflop, or latch, 273, so that output Q of flipflop 273 goes high and output Q-bar (complement of Q) goes low. Output Q-bar going low interrupts microcomputer 61 at low-active interrupt pin INT-bar. Output Q going high causes the control signal generator 51 of FIG. 4 to generate a pattern of control signals to reduce the current in the winding stages by changing the Commutate pattern to a Monitor pattern (see FIG. 4B).

Current interrupt and speed circuit 81, microcomputer 61, and control signal generator 51 together constitute means for producing the successive patterns of the control signals in at least one preselected sequence to switch on only one electronic device in each of at least two of the sets of the electronic devices at once and cause a current to flow in the winding stages to rotate the rotatable means, and for subsequently producing a pattern of the control signals to switch off one of the electronic switching devices which was previously switched on so that the commutating circuit 31 leaves all of the winding stages temporarily unpowered and also provides a current path for the previously-powered winding stages. Current interrupt and speed circuit 81 together with microcomputer 61 constitute means for producing the successive patterns of the digital signals in at least one preselected sequence to switch on only one electronic device in each of at least two of the sets of the electronic devices at once and cause a current to flow in the winding stages to rotate the rotatable means, and for subsequently producing a pattern of the digital signals to switch off one of the electronic switching devices which was previously switched on, the identity of the one device switched off depending on the last pattern produced in the sequence (e.g. as a result of the Rail Disable information in the first two rows of Tables I and II), so that the commutating means leaves all of the winding stages temporarily unpowered and also provides a current path for the previously-powered winding stages.

Control signal generator 51 constitutes means responsive to successive patterns of digital signals for generating the successive patterns of the control signals for the commutating means, the generating means including first and second logic gate means (e.g. 167 and 169) feeding the sets of electronic devices in the commutating means and having inputs driven by respective pairs of digital signals (e.g. inverting buffers 175,176; 177,178; and 179,180) in the digital signal patterns, means for disabling the first and second logic gate means when any of the pairs of digital signals has identical logic levels in the pair (e.g. exclusive-OR gate 183), and means for disabling (e.g. NAND gates 185 and 187) in response to a disabling signal (e.g. Q) a single one of the first and second logic gate means identified by an additional pair of digital signals in the digital signal patterns (e.g. on port P2 lines 7 and 6). Microcomputer 61 constitutes means for producing the successive patterns of the digital signals in at least one preselected sequence to switch on only one electronic device in each of at least two of the sets of the electronic devices at once and cause a current to flow in the winding stages to rotate the rotatable means, and for producing the additional pair of digital signals to have logic levels depending on each pattern in the sequence (e.g. top and bottom disable signals in first two rows of Tables I and II). Current interrupt and speed circuit 81 constitutes means for providing the disabling signal (e.g. Q) in response to an occurrence of a predetermined condition (e.g. excessive current) thereby to switch off one of the electronic devices which was previously switched on.

FIG. 7 illustrates an embodiment adapted for supplying the disabling signal Q by a hardwired circuit comprised in current interrupt and speed circuit 81 which is outboard of microcomputer 61. It is to be understood that Monitor patterns as in FIG. 4B are in alternative embodiments produced by performing operations inside microcomputer 61. In order to accomplish such operations in microcomputer 61, monitor patterns which vary as a function of INDEX are stored in the memory. These monitor patterns are output on lines 62 whenever desired, and they are tabulated for clockwise and counterclockwise rotation respectively in Tables V and VI.

In FIG. 7A, logically complementary waveforms for the Q and Q-bar outputs of flipflop 273 show Q low until the PRESET input of flipflop or latch 273 receives the aforementioned output from comparator 261 or becomes otherwise preset. After a predetermined period of time T1 of nominally 100 microseconds, microcomputer 61 completes an interrupt routine and sends a pulse on line DB7 to input CLR to clear flipflop 273, causing the Q output to go low again, and Q-bar to go high. If and when the motor current rises above the predetermined level again, comparator 261 again presets flipflop 273, protecting motor M from overcurrents. Flipflop 273 has its data (D) input and clock (CLK) inputs grounded. The output of comparator 261 is also connected to the T0 testable input of microcomputer 61 for advantageous flexibility of operations.

In addition to protecting motor M, circuit 81 also provides a means for producing pulses at an adjustable rate, as if the predetermined level were exceeded, when the current is actually less than the predetermined level, so that the speed of the motor in the laundry apparatus 11 is adjustable. With output Q of flipflop 273 low, inverter 275 produces an output High, charging capacitor 277 through resistor 279. The time constant of capacitor 277 with resistor 279 is on the order of one millisecond, for example. The voltage across capacitor 277 is applied through a voltage divider consisting of resistors 281 and 283 to the inverting (−) input of a comparator 285. Comparator 285 has a positive feedback resistor 287 for hysteresis. The noninverting (+) input of comparator 285 is fed with the adjustable speed-related output of a voltage divider consisting of resistor 289 and potentiometer 291 through resistor 293. As capacitor 277 charges, it reaches a voltage greater than that set by potentiometer 291, causing the output of comparator 285 to go low. The low output of comparator 285 is fed to the preset input of flipflop 273, causing output Q to go high and Q-bar to go low, interrupting microcomputer 61. During time T1, the High from output Q is inverted by inverter 275 so that the output of inverter 275 goes low and at least partially discharges capacitor 277. Microcomputer 61 clears flipflop 273 after time T1, causing output Q to go low.

Inverter 275 in turn goes high, progressively charging capacitor 277. Then comparator 285 in circuit portion 295 of current interrupt and speed circuit 81 causes flipflop 273 to produce a disabling signal Q high and interrupt microcomputer 61 again when a second time interval T2 has elapsed. Setting potentiometer 291 to a higher voltage position increases the time interval T2. Increasing time interval T2 increases the speed of the motor because the speed of the motor increases with increasing duty cycle, and the duty cycle is the ratio T2/(T2+T1). It is noted that in the embodiment of FIG. 7, T1 is set inside the microcomputer 61, and T2 is set outside by circuit 295. In other embodiments T1 is set outside microcomputer 61 and T2 is set inside the microcomputer 61. In still other embodiments both T1 and T2 are set inside microcomputer 61. In yet other embodiments both T1 and T2 are set outside microcomputer 61.

TABLE I

DATA FOR CLOCKWISE ROTATION

| P2 Line | Rail Disable | Sequence of Patterns | | | | | |
|---|---|---|---|---|---|---|---|
| DIGITAL SIGNALS | | | | | | | |
| 7 | Top | 0 | 1 | 0 | 1 | 0 | 1 |
| 6 | Btm | 1 | 0 | 1 | 0 | 1 | 0 |
| 5 | | 1 | 1 | 1 | 1 | 0 | 0 |
| 4 | | 1 | 1 | 1 | 0 | 0 | 1 |
| 3 | | 1 | 1 | 0 | 0 | 1 | 1 |
| 2 | | 1 | 0 | 0 | 1 | 1 | 1 |
| 1 | | 0 | 0 | 1 | 1 | 1 | 1 |
| 0 | | 0 | 1 | 1 | 1 | 1 | 0 |
| INDEX: | | 0 | 1 | 2 | 3 | 4 | 5 |
| INDEXR: | | 0 | 1 | 2 | 3 | 4 | 5 |
| CONTROL SIGNALS: | | A+ C− | B+ C− | B+ A− | C+ A− | C+ B− | A+ B− |
| DIGITIZED VOLTAGE | | 01 (B) | 02 (A) | 04 (C) | 01 (B) | 02 (A) | 04 (C) |
| MASK: TEST BIT ORDER: | | 0,1 | 1,0 | 0,1 | 1,0 | 0,1 | 1,0 |

TABLE II

DATA FOR COUNTERCLOCKWISE ROTATION

| P2 Line | Rail Disable | Sequence of Patterns | | | | | |
|---|---|---|---|---|---|---|---|
| DIGITAL SIGNALS | | | | | | | |
| 7 | Top | 0 | 1 | 0 | 1 | 0 | 1 |
| 6 | Btm | 1 | 0 | 1 | 0 | 1 | 0 |
| 5 | | 0 | 0 | 1 | 1 | 1 | 1 |
| 4 | | 1 | 0 | 0 | 1 | 1 | 1 |
| 3 | | 1 | 1 | 0 | 0 | 1 | 1 |
| 2 | | 1 | 1 | 1 | 0 | 0 | 1 |
| 1 | | 1 | 1 | 1 | 1 | 0 | 0 |
| 0 | | 0 | 1 | 1 | 1 | 1 | 0 |
| INDEX: | | 0 | 1 | 2 | 3 | 4 | 5 |
| INDEXR: | | 12 | 13 | 14 | 15 | 16 | 17 |
| CONTROL SIGNALS: | | A+ B− | C+ B− | C+ A− | B+ A− | B+ C− | A+ C− |
| DIGITIZED VOLTAGE | | 04 (C) | 02 (A) | 01 (B) | 04 (C) | 02 (A) | 01 (B) |
| MASK: TEST BIT ORDER: | | 0,1 | 1,0 | 0,1 | 1,0 | 0,1 | 1,0 |

TABLE III

CLOCKWISE ROTOR POSITION SENSING

| P1 | | Digitized Back EMFs | | | | | |
|---|---|---|---|---|---|---|---|
| 0 | B | 0 | 0 | 1 | 1 | 1 | 0 |
| 1 | A | 1 | 1 | 1 | 0 | 0 | 0 |
| 2 | C | 1 | 0 | 0 | 0 | 1 | 1 |

TABLE III-continued

CLOCKWISE ROTOR POSITION SENSING

| P1 | | Digitized Back EMFs | | | | | |
|---|---|---|---|---|---|---|---|
| HEX: | | 6 | 2 | 3 | 1 | 5 | 4 |
| R3: | | −4 | 1 | −2 | 4 | −1 | 2 |
| OFFSET R3: | | −8 | 5 | −6 | 8 | −5 | 6 |
| INDEX: | | 1 | 0 | 5 | 4 | 3 | 2 |
| INDEXR: | | 1 | 0 | 5 | 4 | 3 | 2 |
| DIGITIZED VOLTAGE MASK: | ALLHI=07. | Mask for A, B, C at same time. | | | | | |

TABLE IV

COUNTERCLOCKWISE ROTOR POSITION SENSING

| P1 | | Digitized Back EMFs | | | | | |
|---|---|---|---|---|---|---|---|
| 0 | B | 1 | 0 | 0 | 0 | 1 | 1 |
| 1 | A | 1 | 1 | 1 | 0 | 0 | 0 |
| 2 | C | 0 | 0 | 1 | 1 | 1 | 0 |
| HEX: | | 3 | 2 | 6 | 4 | 5 | 1 |
| R3: | | −1 | 4 | −2 | 1 | −4 | 2 |
| INDEX: | | 1 | 0 | 5 | 4 | 3 | 2 |
| INDEXR: | | 13 | 12 | 17 | 16 | 15 | 14 |
| DIGITIZED VOLTAGE MASK: | ALLHI=07. | Mask for A, B, C at same time. | | | | | |

TABLE V

MONITOR PATTERNS FOR CLOCKWISE ROTATION

| P2 Line | Rail Disable | Sequence of Patterns | | | | | |
|---|---|---|---|---|---|---|---|
| DIGITAL SIGNALS | | | | | | | |
| 7 | Top | 0 | 1 | 0 | 1 | 0 | 1 |
| 6 | Btm | 1 | 0 | 1 | 0 | 1 | 0 |
| 5 | | 1 | 1 | 1 | 1 | 1 | 0 |
| 4 | | 1 | 1 | 1 | 1 | 0 | 1 |
| 3 | | 1 | 1 | 1 | 0 | 1 | 1 |
| 2 | | 1 | 1 | 0 | 1 | 1 | 1 |
| 1 | | 1 | 0 | 1 | 1 | 1 | 1 |
| 0 | | 0 | 1 | 1 | 1 | 1 | 1 |
| INDEX: | | 0 | 1 | 2 | 3 | 4 | 5 |
| INDEXR: | | 0 | 1 | 2 | 3 | 4 | 5 |
| CONTROL SIGNALS: | | A+ | C− | B+ | A− | C+ | B− |

TABLE VI

MONITOR PATTERNS FOR COUNTERCLOCKWISE ROTATION

| P2 Line | Rail Disable | Sequence of Patterns | | | | | |
|---|---|---|---|---|---|---|---|
| DIGITAL SIGNALS | | | | | | | |
| 7 | Top | 0 | 1 | 0 | 1 | 0 | 1 |
| 6 | Btm | 1 | 0 | 1 | 0 | 1 | 0 |
| 5 | | 1 | 0 | 1 | 1 | 1 | 1 |
| 4 | | 1 | 1 | 0 | 1 | 1 | 1 |
| 3 | | 1 | 1 | 1 | 0 | 1 | 1 |
| 2 | | 1 | 1 | 1 | 1 | 0 | 1 |
| 1 | | 1 | 1 | 1 | 1 | 1 | 0 |
| 0 | | 0 | 1 | 1 | 1 | 1 | 1 |
| INDEX: | | 0 | 1 | 2 | 3 | 4 | 5 |
| INDEXR: | | 12 | 13 | 14 | 15 | 16 | 17 |
| CONTROL SIGNALS: | | A+ | B− | C+ | A− | B+ | C− |

The flow diagrams of FIGS. 8-17 and 19 describe processes, methods, and operations contemplated in some of the embodiments of the invention, regardless of any particular manner of implementation using hardware or software. A listing of an illustrative assembly language program for the Intel 8748 microcomputer as microcomputer 61 is included in the present application as Appendix I. A table correlating the listing of Appendix I with the flow diagrams is included as Appendix II. It is to be understood that the assembly language program is used in microcomputer 61 to make it perform many of the same processes, methods and operations shown in the flow diagrams while differing in order of listing and in some details from the flow diagrams of FIGS. 8-17 and 19. Thus Appendix I further illustrates and discloses some of the variety of implementations possible in the practice of the invention according to the principles thereof.

In FIG. 8, operations commence at START 301 and at step 305 equates are made to set up in memory some or all of the information contained in Tables I through VI of the present specification. More specifically, the information includes the patterns of digital signals for clockwise and counterclockwise rotation, which are designated "Control Driver Pattern For Clockwise Direction" and "Control Pattern For Running Counter Clockwise Direction" in Appendix I. In addition, the information includes identified inputs to the microcomputer 61 in the rows designated "Digitized Voltage Mask" in Tables I and II and the lines designated "Test Pattern For CW/CCW" in Appendix I. Control equates are also made in Appendix I for masking the input lines to port P1 from the switches for On/Off, Wash/Spin, CW/CCW, 5/250 REV, and Hi/Low Speed, for clearing flipflop 273 of FIG. 7, setting certain time values, and for other purposes.

At step 307 and step 309 outputs are turned off and other housekeeping functions are accomplished. These include producing a digital signal pattern "OFF" consisting of all ones from output port P2 on lines 62 of FIG. 4 so that all zeros are generated by control signal generator 51 for turning off the motor M. Flipflop 273 is cleared, High/Low Speed circuit 41 of FIG. 1 is set to Low, and initializing of the microcomputer 61 is performed.

A point 311 in the operations is designated STRTST. STRTST is located at the beginning of operations which determine whether the laundry apparatus is still on and whether the wash or spin mode is to be changed. At step 313 the state of On/Off switch 231.5 is read at port P1, line 7, and at step 315 operations branch back to STRTST until switch 231.5 is turned from the OFF position to the On position. When switch 231.5 is on, point 316 designated RUN is reached. Then at step 317 the CW/CCW switch 231.3 is read at port P1, line 5, and the setting as clockwise or counterclockwise is stored. At step 319 the Wash/Spin switch 231.4 is read at port P1, line 6, and the mode commanded by it is stored. At step 321, the mode stored is tested, and if it is "Wash", operations proceed to point 323 and FIG. 9, otherwise to "Spin" point 325 and FIG. 14.

Figure 9:
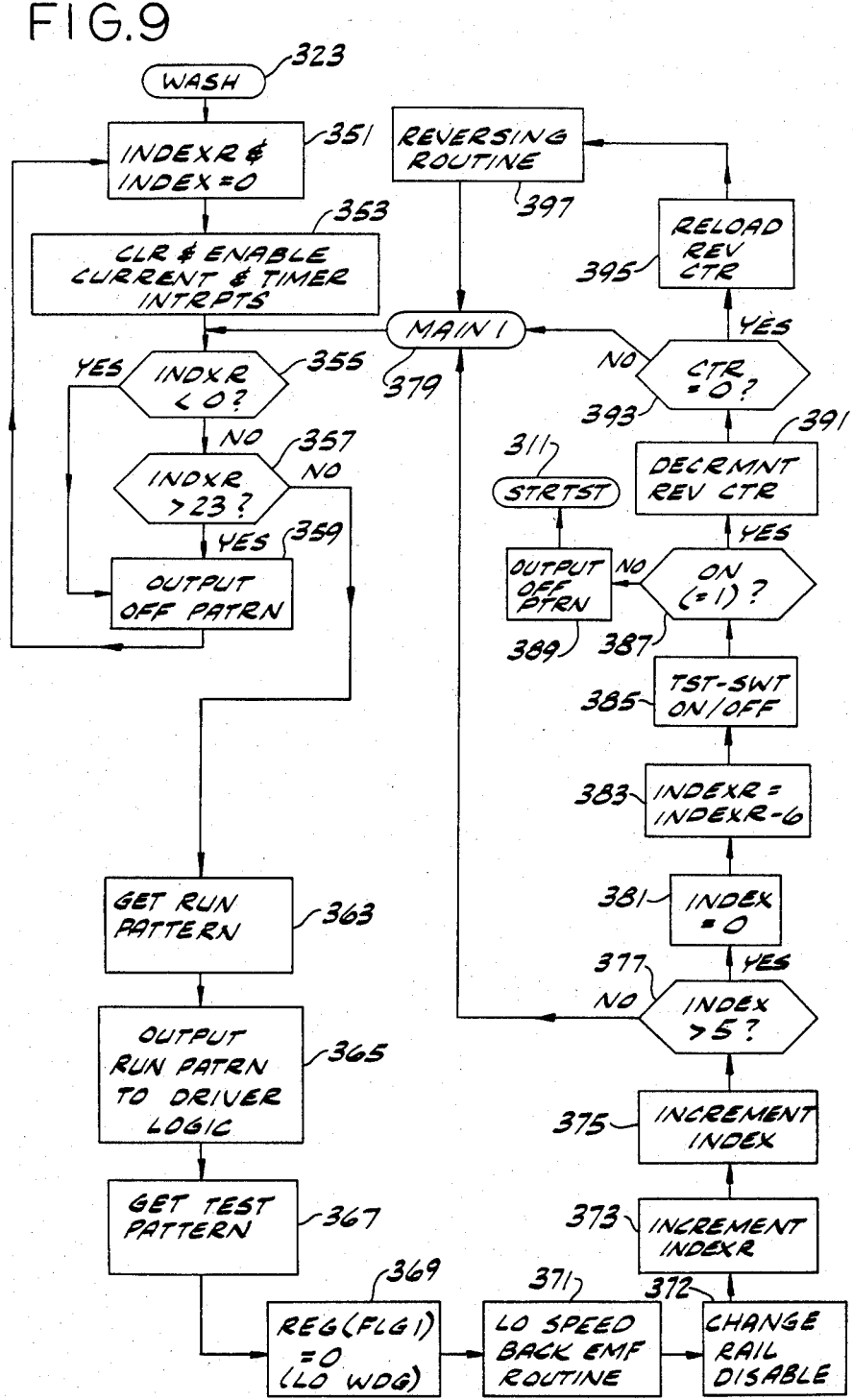
FIG. 9 is an additional part of the flow diagram of operations performed by the microcomputer of FIG. 1 in accordance with the invention in accomplishing a washing mode selected in the operations of FIG. 8.

In FIG. 9, the wash mode is executed beginning at point 323. A predetermined point in the preselected sequence for clockwise rotation (left-most column of Table I) is selected by setting INDEX and INDEXR to zero at step 351. Flipflop 273 is cleared and current and timer interrupts are enabled at step 353. Steps 355, 357, and 359 check INDEXR to assure that it does not have a value clearly indicating some error in the system. If INDEXR is negative or greater than 23, an OFF digital signal pattern (all ones) is produced at step 359, and operations loop back to step 351.

Next at step 363 a digital signal pattern is obtained from memory and stored in the accumulator. For example, the first digital signal pattern so obtained is 01111100 from the leftmost column of Table I. Next at step 365, the digital signal pattern is produced from the accumulator as an output on lines 62 for control signal generator 51 (termed "driver logic" on the flow diagram). In step 367 a test pattern, which is 0,1 or 1,0 is obtained from memory for use in testing the digitized voltage as explained in connection with FIG. 6A. The test pattern to be used is tabulated in Tables I and II in the same column as the digital signal pattern which has just been produced. Equivalently, and as discussed in connection with FIGS. 10 and 15, the test bit order is directly implemented in the coding as a function of whether INDEX is even or odd, and step 367 is omitted. At step 369 a register for a flag FLG1 is set to zero, indicating that the low speed connection arrangement for the winding stages is intended. At step 371 and as more fully discussed in connection with FIG. 10, the digitized voltage of FIG. 6A is tested, and as soon as complementary bits, or logic levels, in the proper test bit order have been sensed, operations proceed to advance in sequence to commutate the winding stages. If complementary bits are not sensed in the predetermined proper test bit order in a predetermined time period, operations proceed to advance in the sequence anyway and force-commutate the motor.

At step 372 the rail disable signals on lines 7 and 6 of port P2 of microcomputer 61 are reversed. "Rail" as used herein means either one of supply conductors 113 and 115. In this way control signal generator 51 is prepared by microcomputer 61 for any pulse width modulation (PWM) which may occur by output Q going high as soon as the back emf routine 371 is complete. As such, microcomputer 61 constitutes means for also selecting the digitized voltage across the at least one unpowered winding stage when digital signal patterns are produced in sequence and changing the logic levels of the additional pair of digital signals (e.g. on lines 7 and 6 of port P2) as soon as at least one predetermined logic level (e.g. of the test bits) of the selected digitized voltage has occurred.

At steps 373 and 375, INDEXR and INDEX are respectively incremented, moving one column to the right, in effect, in Table I or II. If INDEX has not reached the number 6 at step 377, operations loop back to a point 379 designated MAIN1 and continue with the sequence of steps 355-377, commutating the motor until INDEX reaches 6. When INDEX reaches 6, a branch is made from step 377 to step 381. The value INDEX is essentially treated modulo 6, so that operations cycle through Tables I and II, to commutate the motor as long as desired. INDEX is reset to zero at step 381. At step 383, INDEXR is decreased by 6. The latter operation recognizes that when counterclockwise rotation is being executed in Table II, INDEXR reaches the number 18 when INDEX is 6, so that INDEXR must be cycled back to a permitted number 12 in Table II by subtraction by 6.

At step 385 the On/Off switch 231.5 of FIG. 6 is tested. If the switch has been turned off, a branch is made from step 387 to step 389 whence the pattern OFF (all ones on lines 62) is output to shut the motor off, and operations return to STRTST point 311 in FIG. 8 to poll the switch until it is turned on. Assuming On/Off switch is on when step 387 was first reached, operations proceed to step 391 to decrement a revolution counter which has been originally loaded in step 309 of FIG. 8 with a number 5 (center-post agitator laundry apparatus) or a number 250 (tumbler-type laundry apparatus). In this way microcomputer 61 counts revolutions of rotatable means 15 in step 391 by counting at steps 375, 377, and 381 the successive patterns of digital signals produced. When the revolution counter has been decremented at step 391, a test of its contents at step 393 for the number zero is made to determine whether all of the revolutions in a stroke of agitation have been completed by motor M. If not, operations loop to MAIN1 and continue with step 355 and the subsequent steps to continue commutating motor M in the same direction of rotation. If the revolution counter has reached zero, a branch is made from step 393 to step 395 where the counter is reloaded with the number 5 or 250, depending on the setting of switch 231.2 of FIG. 6. In step 397, operations are performed to prepare for commutation in the opposite direction, as discussed more fully in connection with FIG. 11.

In FIG. 10, low speed back emf routine 371 commences with BEGIN 401. A two-millisecond interrupt timer is started running at step 403. At step 405, the value of INDEX representing the point in the sequence in the Table I or II is checked for being even or odd. If it is even (INDEX=0,2,4) the test bit order is 0,1. The digitized voltage of FIG. 6A is tested at step 407 and the testing is repeated by branching back from step 409 until the first test bit of 0 is found, whence the two-millisecond interrupt timer is cleared at step 411 and step 417 is reached. It is noted that the repeated execution of steps 407 and 409 until the zero (0) is found corresponds to arrows 235.1-235.3 in FIG. 6A. If INDEX is odd (1,3,5), the test bit order utilized is 1,0. The digitized voltage (which is inverted in polarity from that of FIG. 6A) is tested at step 413 and the testing is repeated by branching back from step 415 until the first test bit of 1, this time, is found, whence the two-millisecond interrupt timer is cleared at step 411 and step 417 is reached. If the repeated testing at either step 407 or 413, as the case may be, continues for 2 milliseconds without avail, a timer interrupt occurs and operations proceed to step 417.

An 18-millisecond interrupt timer is started running at step 417. At step 419, the value of INDEX representing the point in the sequence in the Table I or II is checked for being even or odd. If it is even (INDEX=0,2,4) the test bit order is 0,1 as already stated. The digitized voltage of FIG. 6A is tested at step 421 and the testing is repeated by branching back from step 423 until the second test bit of 1 (in 0,1) is found, whence the 18-millisecond interrupt timer is cleared at step 425 and RETURN 427 is reached. It is noted that the repeated execution of steps 421 and 423 until the one (1) is found corresponds to arrows 235.4-235.8 in FIG. 6A. If INDEX is odd (1,3,5), the test bit order utilized is 1,0 as already stated. The digitized voltage (which is inverted in polarity from that of FIG. 6A) is tested at step 429 and the testing is repeated by branching back from step 431 until the second test bit of 0 (zero), this time, is found, whence the 18-millisecond interrupt timer is cleared at step 425 and RETURN 427 is reached. If the repeated testing at either step 421 or 429, as the case may be, continues for a full 18 milliseconds without avail, a timer interrupt occurs and operations proceed to RETURN 427.

FIG. 11 shows the reversing routine 397 of FIG. 9 in greater detail. Operations commence therein at BEGIN 451. INDEX is initialized to zero at step 453. The direction variable DIRECT is tested at step 455. If DIRECT is 0, for clockwise (CW) rotation, step 457 changes it to 1, for counterclockwise (CCW) rotation, and INDEXR is increased by 12 at step 459 in order to enter the range of INDEXR in Table II. If DIRECT is 1 for CCW rotation in step 455, step 461 changes it to 0, for CW rotation, and INDEXR is decreased by 12 at step 463 in order to enter the range of INDEXR in Table I. Steps 455-463 are in effect operations by which microcomputer 61 changes INDEXR and the direction variable DIRECT which are subsequently used in producing successive patterns of digital signals for achieving the desired direction of rotation of motor M.

Before the motor M is commutated in the opposite direction from that in which it was turning previously, it is caused to stop rotating by operations which commence at MTROFF point 465, and proceed to produce an OFF pattern (all ones on lines 62) at step 467. The motor M, having its power removed, coasts to a stop. However, microcomputer 61 needs to known when the motor has actually stopped. This information is obtained by first loading a counter at step 469 with a predetermined number indicative of a predetermined time period during which there should be no back emf observed when and if the motor has actually stopped. Next at step 471 one or more of the port P1 inputs 0, 1, and 2 is sensed for its digitized voltage. As long as the rotor is coasting, the digitized voltage from each of the winding stages is a succession of highs and lows. If a zero, or low, is sensed, the rotor may still be coasting or it may have stopped, but if a one, or high, is sensed, the rotor must still be coasting. Accordingly, a branch is made from step 473 if a high bit, or logic level of one, is sensed and the counter is reloaded with the predetermined number at step 469 since the rotor must still be coasting. On the other hand, operations proceed from step 473 to step 474 if a low bit, or logic level of zero, is sensed, and the counter is decremented. Since the rotor may still be coasting, however, a branch is made from step 477 back to testing step 471 unless the counter has been decremented to zero. In this way if the rotor is still coasting, a one (1) bit indicating existence of back emf is sensed sooner or later at step 471 and the counter can be reloaded at step 469 as a result of the branch from step 473. Eventually the rotor stops and a sufficient time period elapses without back emf to assure microcomputer 61 that the rotor has stopped. The counter is decremented to zero and operations proceed from step 477 to RETURN 479.

In having the capability to perform the reversing routine of FIG. 11, microcomputer 61 and control signal generator 51 together constitute means for causing the rotatable means to reverse in its direction of rotation by producing a pattern of the control signals for causing the commutating means to remove power from all of the winding stages, for sensing the digitized voltages while the power is so removed, and for producing successive patterns of the control signals in a second preselected sequence to rotate the rotatable means in the reverse direction only after a predetermined time period has elapsed subsequent to the last occurrence of a predetermined logic level in any of the digitized voltages.

FIG. 11A shows a series of operations of microcomputer 61 for braking motor M to stop the rotation more quickly than occurs when motor M is permitted to coast to a stop as in FIG. 11. The operations of FIG. 11A are performed in substitution for the steps 467,469,471,473,475,477 and 479 of FIG. 11 in a reversing routine and performed at any point in the operations of microcomputer 61 where braking is deemed desirable by the skilled worker. Braking operations commence with BEGIN 481 and proceed to produce an OFF pattern 483 (all one on lines 62) for leaving all of the winding stages of motor M unpowered. Microcomputer 61 waits for a delay period of illustratively 3 milliseconds at step 485 before proceeding to step 487. At step 487 a braking pattern of the digital signals is produced as shown at FIG. 4B in connection with the entry "BRAKE." The braking pattern causes commutating circuit 31 to connect together all of the terminals of the winding stages selected by High-low speed circuit 41. The mechanical energy stored in the rotor is rapidly dissipated electrically because the winding stages are in effect shorted together. At step 489 another delay period, this time for 12.5 milliseconds, is executed by microcomputer 61. Another OFF pattern is produced at step 491, followed by another 3 millisecond delay by the microcomputer 61 at step 493, and braking operations are completed at RETURN 495.

In having the capability to perform the steps described in connection with FIG. 11A, microcomputer 61 and control signal generator 51, as pattern producing and digitized voltage sensing means, constitute means for also producing a pattern of the control signals which causes the commutating circuit 31 to switch all of the winding stages to one of the supply conductors 113 or 115, thereby braking the motor M.

An interrupt low at the INT-bar pin of microcomputer 61 can occur at any time during the washing mode or spin mode operations of laundry apparatus 11. FIG. 12 illustrates a sequence of operations which occurs upon interrupt. Interrupt operations commence at BEGIN 501. Optional step 507 is described later in connection with FIG. 13. The high-low speed flag FLG1 is checked at step 513. If the flag is a zero (low speed winding selection), an internal timer (not shown) in microcomputer 61 is loaded with a number corresponding to the predetermined time period T1 (FIG. 7A) of 100 microseconds in step 515, and if the flag is a one (high speed winding selection), the timer is loaded for a predetermined time period T1 of 50 microseconds at step 517 to take account of the higher motor speeds. Next at steps 519 and 521 the timer is decremented until it reaches zero thereby to execute a delay for the time period T1 and indicating that time period T1 has elapsed. An optional step 523 is discussed below in connection with FIG. 13. At step 525 microcomputer 61 transmits a pulse on the line DB7 of FIG. 7 to clear the latch or flipflop 273 whence interrupt operations are completed at RETURN 527.

In FIG. 7A the duty cycle of pulse width modulation (PWM) for motor M is controlled by causing the Q and Q-bar outputs of latch 273 to change state between time periods T1 and T2 as shown. FIG. 7 reflects a hardware approach for setting T2 by means of circuit portion 295, and the microcomputer 61 sets T1 in the interrupt routine of FIG. 12.

In FIG. 13 a software approach is suggested for controlling the time period T2 when the motor M is powered. The circuit portion 295 of FIG. 7 is deleted in a now-described alternative embodiment. An otherwise unused output line such as DB5 (not shown) is connected to the PRESET input of latch 273. Variable duty cycle instructions corresponding to the operations called for in FIG. 13 are inserted between steps 315 and 317 of FIG. 8 at the point designated RUN. At step 531 input information corresponding to the desired duty cycle is read in to microcomputer 61 as from switches 231.6, 231.7, 231.8, and 231.9 at pins DB0–DB3 of FIG. 6. This duty cycle information is a 4 bit binary code when pins DB0–DB3 are used for input, so that 16 values of duty cycle D1 are selectable. Given a predetermined time period T1 value, there corresponds a particular value of T2 which solves the duty cycle equation $$D1 = T2/(T2+T1) \tag{1}$$

The duty cycle equation (1) is solved for time period T2 for time-on with result:

$$T2 = T1(D1/(1-D1)) \tag{2}$$

Values of T2 are stored in a table in memory corresponding to the values of desired duty cycle D1 which can be read in in step 531. When one of the values D1 is read in, the corresponding value of T2, or time-on, is fetched from the table in step 533. At step 535 the interrupt process is enabled so that microcomputer 61 can be interrupted by excessive current sensed by comparator 261 of FIG. 7. Then at step 537 a timer is loaded with a number corresponding to the time-on T2 and set running. The timer (not shown) is an internal timer in microcomputer 61 which is for present purposes called a duty interrupt timer. Microcomputer 61 executes the operations of FIG. 8 and of the washing and spin modes selected, but is interrupted when the duty interrupt timer times out at the end of time period T2, beginning the interrupt routine of FIG. 12.

The FIG. 12 interrupt routine now is described with the optional steps 507 and 523 included. At step 507 interrupt pin INT-bar is masked to avoid interaction with latch 273, and latch 273 of FIG. 7 is set by transmitting a zero or Low from microcomputer 61 to its PRESET input. The Q output of latch 273 goes high, leaving motor M unpowered through control signal generator 51 and commutating circuit 31. The interrupt operations proceed in steps 513–521 so that predetermined time period T1 elapses. At step 523, the duty interrupt timer in microcomputer 61 is reloaded with a value corresponding to time period T2 and set running again. Latch 273 is cleared at step 525, bringing its Q output low and powering the motor M again. Also at step 525 interrupt pin INT-bar is enabled so that any overcurrent interrupt caused by comparator 261 can be sensed.

Figure 14:
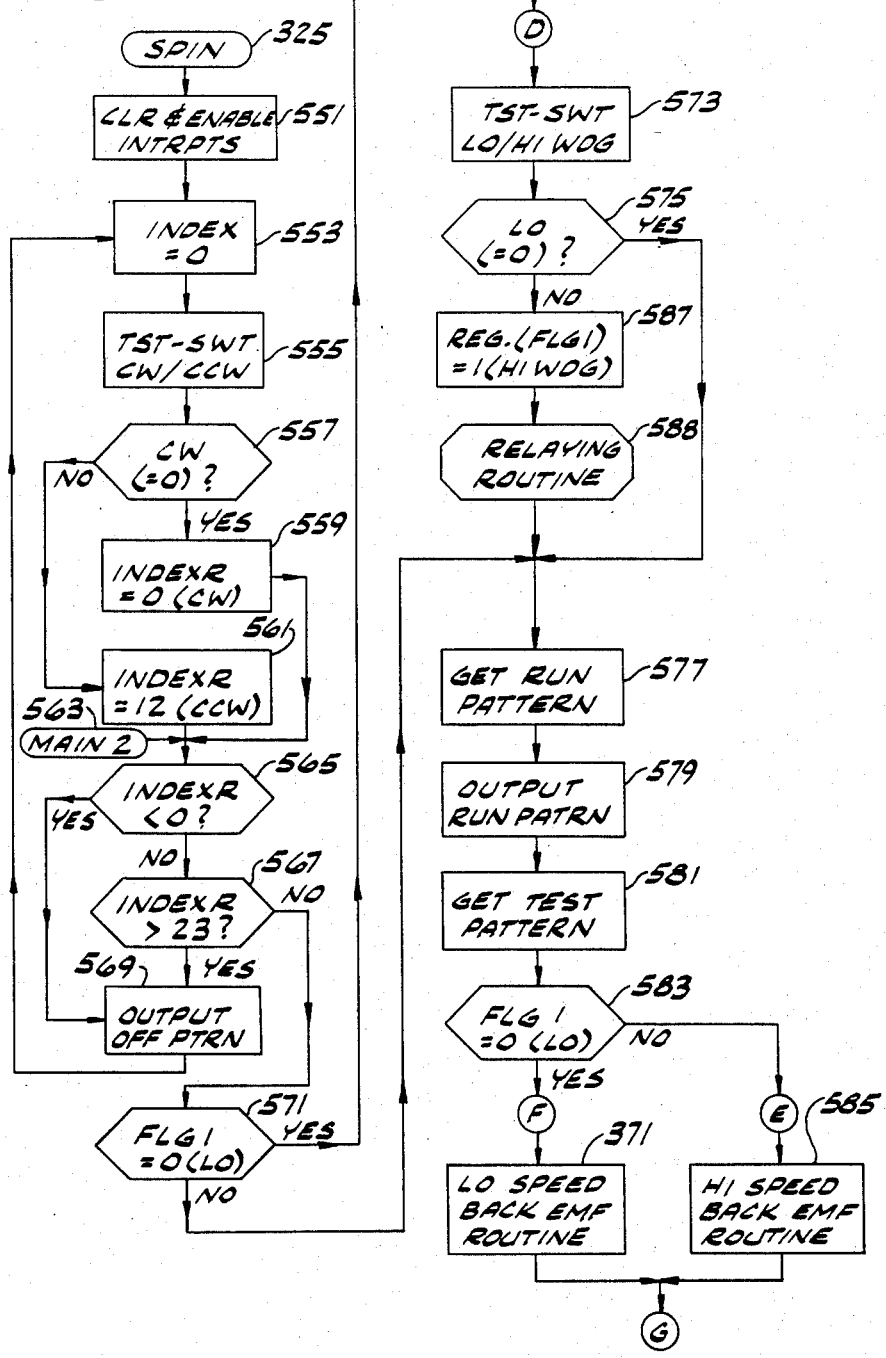
FIG. 14 is a flow diagram of operations performed by the microcomputer of FIG. 1 in accordance with the invention in accomplishing a spin mode selected in the operations of FIG. 8.

The spin mode of laundry apparatus 11 has operations shown in FIG. 14 which commence at point 325. Microcomputer 61 clears latch 273 and enables interrupts in step 551. The value of INDEX is set to zero (0) for purposes of Tables I and II in step 553. The direction in which the motor M is to turn during the spin mode is determined from the setting of switch 231.3 (CW/CCW in FIG. 6) in step 555. If switch 231.3 is set to CW, operations proceed from step 557 to step 559 and the preselected sequence defined in Table I is selected by setting INDEXR to zero in step 559. If switch 231.3 is set to CCW, operations proceed from step 557 to step 561 and the preselected sequence defined in Table II is selected by setting INDEXR to 12 in step 561. Operations of microcomputer 61 reach point 563 designated MAIN2 when either step 561 or step 559 has been completed.

Steps 565, 567, and 569 check INDEXR to assure that it does not have a value clearly indicating some error in the system. If INDEXR is negative or greater than 23, an OFF digital signal pattern (all ones) is produced at step 569, and operations loop back to step 553.

When operations reach step 571, the high-low speed winding flag FLG1 is tested to determine which selection is being made by high-low speed circuit 41. Assume that the selection is initially low and the spin mode is just beginning. FLG1 is zero, indicating low speed winding, and operations pass through point D to step 573 where HI/LOW Speed switch 231.1 is tested. In the present embodiment, switch 231.1 can be initially set in the LOW speed position and the motor M is brought up to a steady speed. Then switch 231.1 is changed to the HI speed position for commanding microcomputer 61 to cause relaying by High-low speed switching circuit 41 and causing motor M is accelerate to a higher speed. The operations of microcomputer 61 in responding to switch 231.1 are described in greater detail next.

When switch 231.1 is set to LOW, indicating that the motor M is to be in the low speed connection arrangement for the time being, a branch is made at step 575 to step 577. At step 577 a digital signal pattern is obtained from memory and stored in the accumulator. For example, the first digital signal pattern so obtained is 01111100 from the leftmost column of Table I when CW/CCW switch 231.3 is in the CW position. Next at step 579, the digital signal pattern is produced from the accumulator as an output on lines 62 (termed "output run patrn" on the flow diagram) for control signal generator 51. In step 581 a test pattern, which is 0,1 or 1,0 is obtained from memory for use in testing the digitized voltage as explained in connection with FIG. 6A. The test pattern to be used is tabulated in Tables I and II in the same column as the digital signal pattern which has just been produced. Equivalently, and as discussed in connection with FIGS. 10 and 15, the test bit order is directly implemented in the coding as a function of whether INDEX is even or odd, and step 581 is omitted. At step 583, depending on whether FLG1 is set for Low (0) or High (1) speed, a branch is made through point F to low speed back emf routine 371 or through point E to high speed back emf routine 585. In each of back emf routines 371 and 585 and as more fully discussed in connection with FIGS. 10 and 15, the digitized voltage of FIG. 6A is tested for complementary bits, or logic levels, in the proper test bit order whence point G is reached.

When motor M is running at low speed, flag FLG1 has been set to zero. Assume that it is desired to accelerate motor M to a higher speed so that switch 231.1 is physically changed to HI. (It is also contemplated that the change from low to high can be alternatively accomplished in software.) FLG1 is still set to zero and in FIG. 14 operations pass through point D to step 573. Now when switch 231.1 is tested at step 573, a branch is made from step 575 to step 587 where flag FLG1 is set to one for High Winding Tap. Then a relaying routine at step 588 is executed for actually relaying from the low speed to the high speed winding connections to motor M and for determining the proper point in the sequence for resuming commutation when the relaying is completed. Relaying routine 588 is described in greater detail in connection with FIG. 17. When operations at steps 573, 575, 587, and 588 have been completed, motor M is commutated and accelerated, and steps 573, 575, 587, and 588 are bypassed by a NO branch from step 571 to step 577 subsequently during high speed rotation. Steps 577, 579, and 581 are performed. At step 583 flag FLG1 is now set for High speed and operations pass through point E to high speed back emf routine 585.

In FIG. 15 high speed back emf routine 585 is similar to low speed back emf routine 371 of FIG. 10 except in being adapted for the shorter time intervals encountered at higher rotor speeds. Operations commence at BEGIN 589 and a one-millisecond interrupt timer is started at step 590. Step 591 unifies the operations performed in steps 405 and 419 of FIG. 10. At step 591, the value of INDEX representing the point in the sequence in the Table I or II is checked for being even or odd. If it is even (INDEX=0,2,4) the test bit order is 0,1. The digitized voltage of FIG. 6A is tested at step 593 and the testing is repeated by branching back from step 595 until the first test bit of 0 is found. The digitized voltage of FIG. 6A is again tested at step 597 and the testing is repeated by branching back from step 599 until the second test bit of 1 is found. Then the one-millisecond interrupt timer is cleared at step 601 and RETURN 603 is reached. It is noted that the repeated execution of steps 593 and 595 until the zero (0) is found corresponds to arrows 235.1–235.3 in FIG. 6A, and repeated execution of steps 597 and 599 until the one (1) is found corresponds to arrows 235.4–235.8. If INDEX is odd (1,3,5), the test bit order utilized is 1,0. The digitized voltage (which is inverted in polarity from that of FIG. 6A) is tested at step 605 and the testing is repeated by branching back from step 607 until the first test bit of 1, this time, is found. Then the digitized voltage is tested at step 609 and the testing is repeated by branching back from step 611 until the second test bit of 0, this time, is found, whence the one-millisecond interrupt timer is cleared at step 601 and RETURN 603 is reached. If the repeated testing at steps 593–599 or 605–611, as the case may be, continues for a full one millisecond without avail, a timer interrupt occurs and operations proceed to RETURN 603.

Figure 16:
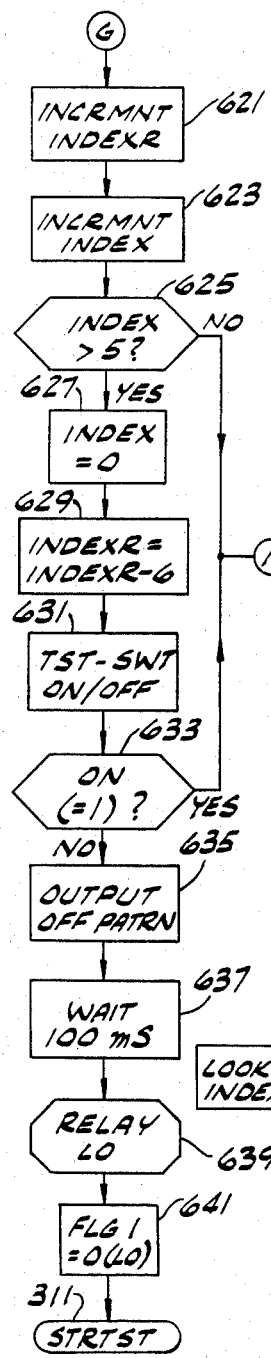
FIG. 16 is a flow diagram of operations performed by the microcomputer of FIG. 1 in accordance with the invention in advancing in a sequence of commutation and turning off the motor on command.

FIG. 16 shows more operations of microcomputer 61 in the spin mode continuing from point G from FIG. 14. The operations advance in sequence of commutation beginning at step 621. At steps 621 and 623, INDEXR and INDEX are respectively incremented, moving one column to the right, in effect, in Table I or II. If INDEX has not reached the number 6, operations branch from step 625 to the point 563 designated MAIN2 in FIG. 14 and continue with the sequence of steps from MAIN2 to point G, commutating the motor until INDEX reaches 6. When INDEX reaches 6, a branch is made from step 625 to step 627. The value INDEX is essentially treated modulo 6, so that operations cycle through Table I or II, depending on rotation direction, to commutate motor M as long as desired in the spin mode. INDEX is reset to zero at step 627. At step 629, INDEXR is decreased by 6. The latter operation recognizes that when rotation is being executed in either Table I or II, INDEXR reaches the number 6 or 18 when INDEX is 6, so that INDEXR must be cycled back to a permitted number 0 or 12 in Table I or II by subtraction by 6.

At step 631 the On/Off switch 231.5 of FIG. 6 is tested. If the switch is still set to "On," operations pass from step 633 back to FIG. 14 point MAIN2 so that commutation continues. If the switch has been turned off, a branch is made from step 633 to step 635 whence the pattern OFF (all ones on lines 62) is output to shut the motor off. At step 637 a loop or counting operation is provided so that microcomputer 61 waits 100 milliseconds or for any other desired time interval. In step 639 microcomputer 61 issues a High on line DB6 (FIG. 3) producing a Low on line H from NAND gate 157, and causing relay 147 in high-low speed circuit 41 to switch back to a low speed connection arrangement. The high-low speed flag FLG1 is reset to zero (low speed) at step 641, and operations pass to STRTST point 311 of FIG. 8, there to poll On/Off switch 231.5 until it is turned on.

In FIG. 17 the relaying routine of step 588 of FIG. 14 is shown in greater detail. Operations commence with BEGIN 651 and proceed to produce the OFF pattern (all ones on lines 62) at step 653 to turn off the motor M. At step 655 microcomputer 61 issues a Low on line DB6 (FIG. 3) producing a High on line H from NAND gate 157, and causing relay 147 in high-low speed circuit 41 to switch from the low speed connection arrangement to a high speed connection arrangement. Microcomputer 61 waits for ten milliseconds as by any suitable routine, such as counting from a preset number down to zero, in step 657 in order to permit the relay 147 armature 155 to come to rest in the high speed position. However, during this waiting period, the rotor 15 of motor M has, or may have, rotated a through a significant angle for commutation purposes. Accordingly, at step 659 a routine is executed for determining the value of INDEX from the sensed digitized voltages on comparator outputs A, B, and C of FIG. 6 when the winding stages are temporarily unpowered, and resuming producing patterns of digital signals on lines 62 beginning with the pattern of digital signals (and thus a corresponding set of control signals from control signal generator 51) identified by the value of INDEX so determined. After step 659 RETURN 661 is reached.

Step 659 of FIG. 17 recognizes that when motor M is unpowered and the rotor is coasting, all of the winding stages are producing back emfs. As shown in FIG. 6, the back emfs are digitized by comparators 201, 203, and 205. The digitized back emfs for three wye-connected winding stages S1, S2, and S3 are illustrated in FIG. 18 and tabulated in Tables III and IV for clockwise and counterclockwise rotation respectively.

In FIG. 18 and in the first three rows of Tables III and IV, the logic levels of the digitized voltages on input lines 0, 1, and 2 of microcomputer 61 are shown when rotor 15 is coasting. Each of the six columns shows the logic levels of the digitized back emfs present at any given time. As the rotor turns, the logic levels of a given column are replaced by the logic levels in the column next to the right. When the right-most column is reached, the logic levels begin again in the left-most column, cycling through the columns as before. FIG. 18 shows superimposed on the logic zeros and ones a waveshape of the digitized back emfs on the input lines 0, 1, and 2. The digitized back emfs at any one time and their changes to other values at other times bear sufficient information to permit sensing the position of the turning rotor 15 and to identify the proper point in sequence for beginning commutation of such turning rotor and for resuming commutation whenever commutation is interrupted or discontinued. Accordingly, the index-determining operations of step 659 as described in further detail in FIG. 19 are used in relaying routine 588 in the preferred embodiment, and are used in other embodiments of the invention whenever it is desired to begin commutation in sequence.

Figure 19:
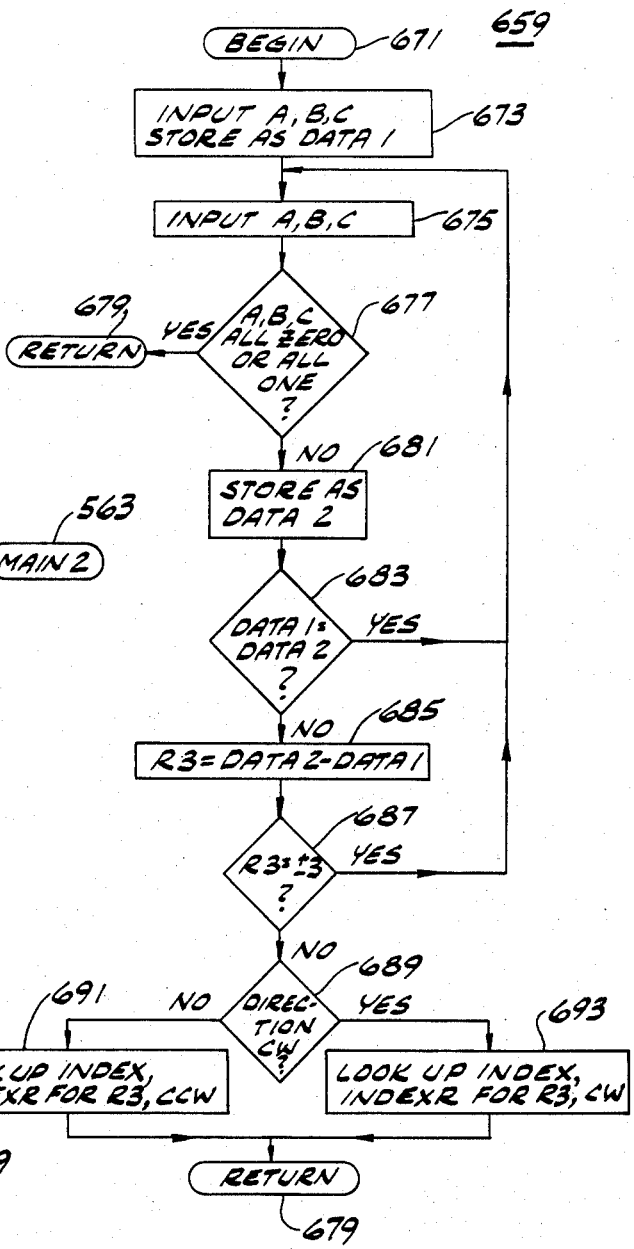
FIG. 19 is a flow diagram of operations performed by the microcomputer of FIG. 1 in accordance with the invention for determining a proper point in sequence to begin or resume commutation when the rotor of the motor is turning, as in the relaying routine of FIG. 17.

In FIG. 19 operations commence with BEGIN 671, and microcomputer 61 inputs all the lines 0,1, and 2 of port P1 at once by masking with ALLHI=07 (binary 00000111). As a result there resides in microcomputer 61 a three bit binary number having binary digits corresponding to each of the digitized voltages on the three lines. This binary number is designated DATA1 and stored in step 673. Then at step 675, microcomputer 61 inputs all the lines 0,1, and 2 of port P1 again in search of digitized voltages corresponding to an adjacent column of digitized voltages in FIG. 18. In order to avoid error, if the latest set of digitized voltages is all zeros (decimal zero (0)) or all ones (decomal seven (7)), then the index determining routine is aborted by passing to RETURN 679. The reason for this is that as shown in FIG. 18, the digitized voltages are never all high at the same time when the rotor is coasting. Also, the digitized voltages are all zero only when the rotor has stopped.

If the digitized voltages are not 0 or 7 as just discussed, then operations proceed from step 677 to step 681 where the digitized voltages just obtained in step 675 are stored and designated DATA2. In step 683, DATA1 is compared with DATA2. If they are the same number, (i.e. DATA1−DATA2=0) the rotor has not turned sufficiently to move to the adjacent rightward column in FIG. 18 and in the Table III or IV corresponding to the direction of rotation. When DATA1=DATA2 a branch is made back to step 675 to input another set, or instance, of digitized voltages until an instance of digitized voltages is found at step 675 which is different from DATA1. At step 685, the difference DATA2−DATA1 is computed. Step 687 checks the value of the difference, which from inspection of differences between the hexadecimal equivalents of the digitized voltages (tabulated in row HEX of Tables III and IV) should not be equal to 3 or −3 if the data is unaffected by noise. If the difference is equal to the unpermitted numbers 3 or −3, a branch is made from step 687 to step 675, until a value of DATA2 is found which passes the test of step 687.

When step 689 is reached, microcomputer 61 has stored values of DATA1 and DATA2 which are in adjacent columns of one of the Tables III or IV. Each Table III or IV lists values of R3, which is the difference DATA2−DATA1, in the column corresponding to the digitized back emfs in DATA1. Beneath a value of difference R3 in each of column of Table III or IV are values of INDEX and INDEXR. The values of INDEX and INDEXR are precisely the values for identifying the proper Table I or II and the proper column therein containing the digital signal pattern which microcomputer 61 can and does then produce to resume commutation of the winding stages at the proper point in sequence. (Beneath the tabulated value of R3 in Table III is an entry designated "Offset R3" which is a number calculated in the program listing of Appendix I for microcomputer table lookup purposes.)

At step 689 microcomputer 61 determines which direction the rotor 15 has been made to turn in. When switch 231.4 is in the spin mode, the direction is given by the setting of switch 231.3 as CW or CCW. When switch 231.4 is in the wash mode, the direction is given by the value of the variable DIRECT of FIG. 11. In either mode the direction can also be obtained from INDEXR. If INDEXR is in the range 0-5, the direction is clockwise, and if INDEXR is in the range 12-17 the direction is counterclockwise.

If the direction determined is counterclockwise, a branch is made from step 689 to step 691 for table lookup in a table in microcomputer 61 having the information found in Table IV in rows R3 and INDEX. When INDEX is found, INDEXR is reset by adding 12 to INDEX. If the direction determined is clockwise, a branch is made from step 689 to step 693 for table lookup in a table in microcomputer 61 having the information found in Table III in rows R3 and INDEX. INDEXR is reset as equal to INDEX when the direction is clockwise. After step 691 or step 693 is executed, RETURN 679 is reached.

The operations of FIG. 19 can be described more generally as follows. Microcomputer 61 identifies successive patterns of the control signals and of the digital signals of Tables I and II by values of an index designated INDEX. A value of the index is determined from the sensed digitized voltages when the winding stages are temporarily unpowered. Microcomputer 61 resumes producing successive patterns of the digital signals which causes control signal generator 51 to generate successive patterns of the control signals in sequence beginning with a pattern of the digital signals and control signals determined from the sensed digitized voltages. The lookup table information stored in microcomputer 61 is a function, i.e. a predetermined correspondence between members of two sets of numbers. The sets of numbers involved here are values of INDEX on the one hand and values of the differences R3. Equivalently, Tables III and IV can be regarded as tabulating INDEX as a function of digitized back emf itself. It is also to be understood that there are a multitude of equivalent ways made known by the disclosure made herein, of setting up a function relating the digitized back emf information to some variable such as INDEX which can be used to determine the proper point for beginning in sequence when commutation begins again. When the successive patterns of digital signals and control signals are identified by values of an index, the index is advantageously determined as a function of a number represented by the sensed digitized voltages when the winding stages are temporarily unpowered, and microcomputer 61 resumes producing patterns beginning with the pattern of the control signals identified by the value of the index so determined. The index is determined as a first function of a number represented by the sensed digitized voltages when the winding stages are temporarily unpowered and the preselected sequence is for clockwise rotation of the rotatable means 15 and determined as a second function of the number so represented when the preselected sequence is for counterclockwise rotation, and microcomputer 61 resumes producing patterns beginning with the pattern of the control signals identified by the value of the index so determined. The value of the index is also determined as a function of the difference of first and second numbers represented by different instances of the sensed digitized voltages, and microcomputer 61 begins with the pattern of the control signals identified by the value of the index so determined. The value of the index is determined as a function of the difference of first and second numbers represented by different instances of the sensed digitized voltages unless one of the numbers is in a set of predetermined numbers, such as 0 and 7, and microcomputer 61 begins with the pattern of the control signals identified by the value of the index so determined. A difference of first and second numbers represented by different instances of the sensed digitized voltages is calculated and a value of the index is determined as a function of the difference unless the difference is in a set of predetermined numbers, such 0, +3, and −3, and microcomputer 61 begins with the pattern of the control signals identified by the value of the index so determined. Microcomputer 61 in this way prevents sensed digitized voltages representing a number in a predetermined set, such as 0 and 7, from being used to determine the beginning pattern of control signals. Microcomputer 61 in FIG. 19 repetitively senses the digitized voltages while the winding stages are temporarily unpowered and determines the beginning pattern of the control signals as soon as a change occurs in any one of the sensed digitized voltages.

In some applications of the invention involving current interrupt as in FIG. 7, the time period T1 when the motor M is unpowered can be long enough to make index-determination as in FIG. 19 advisable. In such circumstances, the index-determining operations of FIG. 19 are inserted in the interrupt routine of FIG. 12 immediately following step 521 so as to update INDEX and INDEXR. Then the control system of FIG. 1 constitutes means for comparing the current flowing the other powered winding stages of the electronically commutated motor M with a predetermined level, and upon the level being exceeded, interrupting the digital computer and also causing the control signal generator 51 to generate a pattern of control signals to discontinue the supply of power to the winding stages, the digital computer comprising means for also monitoring the position of the rotatable means 15 when the winding stages are thus unpowered and resuming producing patterns of the digital signals after a predetermined time interval beginning with a pattern then corresponding to the position of the rotatable means.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

```
ASM48 :F1:SPK300.ASM PRINT(:IF:)

ISIS-II MCS-48/UPI-41 MACRO-ASSEMBLER, V4.0                                    PAGE    1
10 MHZ VERSION PROGRAM: MAIN & SPEED CONTROL

APPENDIX I

ICC   OBJ        LINE     SOURCE STATEMENT

1     $TITLE    ('10 MHZ VERSION PROGRAM: MAIN & SPEED CONTROL')
                    2     $DEBUG
                    3
                    4
                    5
                    6     ;*********************************************************
                    7     ;*                                                       *
                    8     ;*  COPY RIGHT 1982 GENERAL ELECTRIC COMPANY-APPLIANCE MOTOR DEPT  *
                    9     ;*                   ALL RIGHT RESERVED                  *
                   10     ;*                                                       *
                   11     ;*********************************************************
                   12
                   13
                   14
                   15
                   16
                   17
                   18
                   19
                   20
                   21
                   22               ;   PORT ASSIGNMENT
                   23
                   24               PORT2
                   25     P20:      A+ DRIVER
                   26     P21:      C- DRIVER
                   27     P22:      B+ DRIVER
                   28     P23:      A- DRIVER
                   29     P24:      C+ DRIVER
                   30     P25:      B- DRIVER
```

```
31        P26:      BOTTOM RAIL DISABLE
32        P27:      TOP RAIL DISABLE
33
34        PORT1
35        P10:      PHASE B COMPARATOR
36        P11:      PHASE A COMPARATOR
37        P12:      PHASE C COMPARATOR
38        P13:      HI/LOW SPEED SWITCH I/P
39        P14:      5/250 REVOLUTION
40        P15:      CW/CCW
41        P16:      SPIN/WASH
42        P17:      ON/OFF
43
44        BUS
45        IB0:      SPARE SW
46        IB1:      SPARE SW
47        IB2:      SPARE SW
48        IB3:      SPARE SW
49        IB4:      NC
50        IB5:      NC
51        IB6:      RELAY DRIVER
52        IB7:      CLEAR F/F
53
54        TEST PORT
55        T0:       CURRENT SENSING COMPARATOR
56        T1:       NC
57
58        INT:      FLIP FLOP QBAR O/P
59
60        ;CONTROL DRIVER PATTERN-FOR-CLOCKWISE DIRECTION
61  007C  PATTRN   EQU   01111100B       ;MON A+
62  006E  PATTRN1  EQU   10111001B       ;MON C-
63  0073  PATTRN2  EQU   01110011B       ;MON B+
64  00A7  PATTRN3  EQU   10100111B       ;MON A-
65  004F  PATTRN4  EQU   01001111B       ;MON C+
66  009E  PATTRN5  EQU   10011110B       ;MON B-
67        ;        CONTROL PATTERN FOR RUNING COUNTER CLOCKWISE DIRECTION
68  005E  CCWPAT   EQU   01011110B       ;MON A+
```

```
0261        70 CCWPT1   EQU    10001111B        ;MON E-
0267        71 CCWPT2   EQU    01100111B        ;MON C+
026B        72 CCWPT3   EQU    10110011B        ;MON A-
0273        73 CCWPT4   EQU    01110001B        ;MON E+
0275        74 CCWPT5   EQU    10111100B        ;MON G-
            75 ;
            76 ;          CW MONITOR PATTERNS
            77 ;
027E        78 MONITR   EQU    01111110B
02E1        79 MONIT1   EQU    10111111B
02E3        80 MONIT2   EQU    10110111B
02E7        81 MONIT3   EQU    10011011B
02E9        82 MONIT4   EQU    01110111B
02CD        83 MONIT5   EQU    10011111B
            84 ;
            85 ;          CCW MONITOR PATTERNS
            86 ;
027E        87 CCWMCN   EQU    01111110B
02F5        88 CCWMC1   EQU    10001111B
026F        89 CCWMC2   EQU    01101111B
026F        90 CCWMC3   EQU    10110111B
027E        91 CCWMO4   EQU    01110111B
028D        92 CCWMO5   EQU    10111101B
            93 ;
            94 ;          TEST PATTERN FOR CW/CCW
            95 ;
0001        96 TESTCW   EQU    01H
0002        97 TESTC1   EQU    02H
0004        98 TESTC2   EQU    04H
0001        99 TESTC3   EQU    01H
0002       100 TESTC4   EQU    02H
0004       101 TESTC5   EQU    04H
0004       102 TESTCC   EQU    04H
0002       103 TESTW1   EQU    02H
0001       104 TESTW2   EQU    01H
0004       105 TESTW3   EQU    04H
0002       106 TESTW4   EQU    02H
0002       107 TESTW5   EQU    02H
0001       108 TESTW5   EQU    01H
           109 ;
```

```
                    CONTROL EQUATES 0080   110 ;
       111 ;
0080   112 ONMASK  EQU  80H          ;ON/OFF SW MASKING
0040   113 AGMASK  EQU  40H          ;AGITATE/SPIN SWITCH
0020   114 DIRMSK  EQU  20H          ;CW/CCW SW MASK
0010   115 REVMSK  EQU  10H          ;REVOLUTION MASK
0040   116 RLYOFF  EQU  40H          ;TURN RELAY OFF
FFBF   117 RLYON   EQU  NOT RLYOFF
0008   118 SPEEDS  EQU  08H          ;HI/LOW SPEED SW MASK
0077   119 FFPRST  EQU  77H          ;F/F CLEAR
0080   120 FFRST   EQU  80H          ;F/F RESET
00A0   121 MONPTR  EQU  0A0H         ;MONITOR PATTERN MASK
0014   122 MONTIM  EQU  20           ;MONITOR DELAY TIME, 5 US PER STEP
FFC2   123 DLY3M   EQU  -62          ;3 MS TIMER VALUE
FF06   124 DLY12M  EQU  -250         ;12 MS TIMER VALUE
0064   125 DLY2S   EQU  100          ;2 SEC DELAY COUNTER VALUE
0003   126 DLY15M  EQU  03H          ;1.5 MS DELAY COUNTER VALUE
0007   127 AIIHI   EQU  07H          ;MASK FOR COMPARATOR O/P
0003   128 DIFF3   EQU  03H          ;DIFFERENCE 3
000D   129 DIFFD   EQU  0DH          ;DIFFERENCE -3
0004   130 OFFSET  EQU  04H          ;TABLE OFFSET VALUE
000C   131 CWTABL  EQU  12           ;CW PATTERN OFFSET VALUE
0004   132 DEPTIM  EQU  04H          ;DEBOUNCE TIME IN MAIN ROUTINE
0003   133 LOWTIM  EQU  03H          ;DEBOUNCE TIME IN RETURN-TO-MAIN
00FC   134 NOT4    EQU  0FCH         ;2'S COMPLEMENT 4
00FA   135 NOTSIX  EQU  0FAH         ;2'S COMPLEMENT 6
       136 ;
       137 ;----- MEMORY EQUATES
       138 ;
0000   139 ZERO    EQU  0
0001   140 ONE     EQU  1
0002   141 TWO     EQU  2
0003   142 THREE   EQU  3
0004   143 FOUR    EQU  4
0005   144 FIVE    EQU  5
0006   145 SIX     EQU  6
       146 ;
0020   147 DIRECT  EQU  32           ;DIRECTION REGISTER
0021   148 REVCTR  EQU  33           ;REVOLUTION COUNTER
```

```
0022              145  REVCT1  EQU   34              ;REVOLUTION COUNTER 1
0023              150  DATA1   EQU   35              ;DATA REGISTER
0024              151  DATA2   EQU   36              ;DATA REGISTER
                  152  ;
                  153  ;
0000              154          ORG   000H
0000 0409         155          JMP   INITIZ
0002 00           156          NOP
0003 0446         157          JMP   EXTINT
0005 00           158          NOP
0006 00           159          NOP
0007 0454         160          JMP   TIMINT
                  161  ;
                  162  ;
0009 BAFF         163  INITIZ: CRL   P2,#0FFH        ;TURN OFF MOTOR
000B 23FF         164          MOV   A,#0FFH         ;SET BUS FOR INPUT PORT
                  165
000D 02           166          OUTL  BUS,A
000E 9A7F         167          ANL   BUS,#7FFH       ;CLEAR I/F, QBAR=B
0010 8980         168          ORL   P1,#0FFH        ;SET PORT1 FOR INPUT
0012 8840         169          ORL   BUS,#FIRST      ;RESET F/F, CIR=B, QBAR=B
0014 8840         170          CRL   BUS,#RLYOFF     ;TURN OFF RELAY
0016 54C7         171          CALL  DLY20           ;MAKE SURE RELAY IS OFF
                  172  ;
0018 E5           173          CLR   F0              ;CLEAR HI SPEED FLAGS
0019 A5           174          CLR   F1              ;CLEAR TIMER OVERFLOW FLAG
                  175  ;
001A BE3F         176          MOV   R0,#3FB
001C 27           177          CLR   A
001D A0           178  CIRRAM: MOV   GR0,A           ; CLEAR RAMS
001E B81D         179          DJNZ  R0,CIRRAM
                  180  ;
0020 54AC         181          CALL  ICIREV          ;IOAL REVOLUTION COUNTER
                  182  ;
0022 09           183  STRTST: IN    A,P1
0023 53E0         184          ANL   A,#ONMASK
0025 9622         185          JNZ   STRTST
0027 54C7         186          CALL  DLY20           ;DEBOUNCE CHECK ON/OFF SWITCH
0029 09           187          IN    A,P1
```

```
022A 5380              187          ANL     A,#CNMASK
022C 9622              188          JNZ     STRTST
                       189  ;
0022E E920              190  RUN:   MOV     R1,#DIRECT
0230  09                191          IN      A,P1
0231  5320              192          ANL     A,#DIRMSK           ;LOCK CW/CCW SW SETTING
0233  C63A              193          JNZ     SPIN1               ;JUMP IF SW ON CCW
0235  FE0D              194  SPIN0: MOV     R6,#13              ;SW ON CW
0237  11                195          INC     R1                  ;SET ON CW DIRECTION
0238  0431              196          JMP     SPIN2
                       197  ;
023A  FE01              198  SPIN1: MOV     R6,#1               ;SW ON CCW
023C  F100              199          MOV     @R1,#00B            ;SET ON CCW DIRECTION
023E-F101              200  SPIN2: MOV     R7,#1               ;LOAD INDEX = 1
0240  8880              201          ORL     BUS,#FFRST          ;RESET F/F
0242  B803              202          MOV     R0,#3               ;LOAD NO. OF DEBOUNCE TIMES
0244-2412              203          JMP     MAIN
                       204  ;
0246  FE0B              205  EXTINT: MOV    R5,#11
0248-DD48              206  EXTDLY: DJNZ   R5,EXTDLY            ;DELAY 36 US
                       207  ;
024A  15                208          DIS     I                   ;DISABLE CUR. INTRP
                       209  ;
024F  5E7F              210          ANL     BUS,#FFRST          ;CLEAR F/F
                       211                                       ;BERI, C/P SAME PATTERN
0241-8880              212          ORL     BUS,#FFRST          ;RESET F/F
                       213  ;
024F  1652              214          JTF     EXTTIM
0250  93                215          RETR
                       216  ;
0251  35                217  EXTTIM: DIS    TCNTI               ;RESET PENDING INTRP FLAG
0252-25                218          IN      TCNTI
                       219  ;
0254  F5                220  TIMINT: CPI    F1
0255  93                221          RETR
                       222  ;
                       223          ORG     100H                ;FLAG TIMER TIME OUT
0100                   224  ;
```

```
0100 01          225        LB      TESTCW          ;TEST BIT MASKS CORRESPONDING
0101 02          226        LB      TESTC1          ; TO PATTERNS ON PAGE 3
0102 04          227        LB      TESTC2          ;  MASK    YIELDS
0103 01          228        LB      TESTC3          ;   01     INPUT (P4) BIT 1
0104 02          229        LB      TESTC4          ;   02               BIT 2
0105 04          230        LB      TESTC5          ;   04               BIT 3
                 231        ;
010C             232        ORG     10CH
                 233        ;
010C 04          234        LB      TESTCC
010D 01          235        LB      TESTW1
010E 02          236        LB      TESTW2
010F 04          237        LB      TESTW3
0110 02          238        LB      TESTW4
0111 01          239        LB      TESTW5
                 240        ;
0112 A5          241 MAIN:  CLR     F1              ;CLEAR TIMER OVERFLOW FLAG
0113 23C2        242        MOV     A,#IIY3M        ;LOAD DELAY 3 MS
0115 62          243        MOV     T,A
0116 25          244        EN      TCNTI           ;ENABLE TIMER INTRP
0117 55          245        STRT    T               ;START 2MS TIMER
                 246        ;
0118 FE          247        MOV     A,R6            ;EQV LDA @PATTRN(INDEXR)
0119 E3          248        MOVP3   A,@A
011A 2A          249        OUTL    P2,A            ;OUTPUT BIT-PATTERN
                 250        ;
011B FE          251 CHECK: MOV     A,R6            ;CHECK INDEXR FOR EVEN/ODD
011C 5301        252        ANL     A,#01B
011E 1246        253        JB0     CCITST          ;JUMP IF ODD
                 254        ;
011F FE          255        MOV     A,R6            ;GET TEST PATTERN
0120 A3          256        MOVP    A,@A
0121 AA          257        MOV     R2,A
                 258        ;
0122 05          259 EVTST1: EN     I
0123 7620        260        JF1     IOAIT1          ;HI SPEED WINDING
0125 09          261        IN      A,F1            ;JUMP IF TIMER TIME OUT
0126 5223        262        JB4     EVTST1          ;JUMP IF HARDWARE INTRP
0128 5A          263        ANL     A,R2            ;TEST FOR '0' FIRST
```

```
012A 9E23              JNZ    EVTST1         ;(NOT '0', RESET COUNTER)
                ;
026C 35        IOACT1: DIS                   ;DISABLE TIMER INTRP
026D 15                DIS    I              ;DISABLE CURRENT INTRP
012E 1E                CLR    F1
012F FC06              MOV    R4,#6
0131 2306              MOV    A,#HIY12M      ;LOAI 73.44 MS TIMER
                       MOV    T,A
0133 62                EN     TCNTI
0134 25                STRT   T
0135 55
                ;
0136 05        EVTST3: EN     I              ;ENABLE CUR. INTRP
0137 7641              JF1    R4DEC2
0137S-06------EVTST5:--IN-----A,F1-----------;-ANI--THEN-TEST-FOR--'1'
013A 5236              JP4    EVTST3
013C EA                ANI    A,R2
013D C676              JZ     EVTST3         ;(NOT '1', RESET COUNTER)
013F 246A               JMP    NEXT          ;ALL TEST MET, GO ON
                ;
0141 A5       R4DEC2:  CLR    F1
0142 EC35              DJNZ   R4,EVTST5      ;JUMP IF TIMER TIMES OUT
0144 246A              JMP    NEXT

0146 FF       CDTST:   MOV    A,R6           ;EQV TO LDA @TEST(INDEXR)
0147 A3                MOVP   A,@A
0148 AA                MOV    R2,A           ;ODD--GET-TEST-BITS-AND
                ;
0149 05       CITST1:  EN     I              ;BI-SPEED WINDING
014A 7652              JF1    IOACT2         ;JUMP IF TIMER TIME OUT
014C 05                IN     A,F1
014D 5249              JB4    CDTST1
014F 5A                ANI    A,R2           ;TEST FCR '1' FIRST
0150 C649              JZ     CDTST1         ;(NOT '1', RESET COUNTER)
                ;
0152 35       IOACT2: DIS                    ;
0153 15               DIS    I
0154 1E               CLR    F1
0155 FC06             MOV    R4,#6
0157 2306             MOV    A,#HIY12M       ;LOAI 73.44 MS TIMER
```

```
0159 62          MOV   T,A
015A 25          EN    TCNTI
015B 55          STRT  T
                 ;
                 ;                              ;HI-SPEED-WINDING
015C 05  ODTST3: IN
015D 7667        JF1   R4DEC4
015F 05  ODTST5: IN    A,P1
0160 52EC        JB4   ODTST3
0162 5A          ANL   A,R2
0163 9665        JNZ   ODTST3         ;TEST FOR '0'
0165 246A        JMP   NEXT           ;(NOT '0', RESET COUNTER)
                 ;
0167 A5  R4DEC4: CLR   F1
0168 EC5F        DJNZ  R4,ODTST5
                 ;
016A 25  NEXT:   DIS   TCNTI          ;DISABLE TIMER INTERRUPT
016B 65          STOP  TCNT           ;STOP TIMER
016C 05          EN    I              ;RESET F/F IF POSSIBLE
                 ;
016D 0A          IN    A,P2
016E D3C0        XRL   A,#11000000B   ;CHANGE THE RAIL DISABLE IF
0170 3A          OUTL  P2,A           ; ZERO CROSSING
                 ;
0171 1E          INC   R6             ;NEXT STATE, INCREMENT INDEXR
0172 1F          INC   R7             ;INCREMENT INDEX
                 ;
0173 237A        MOV   A,#NOTSIX
0175 6F          ADD   A,R7
0176 F2E5        JB7   DELY1          ;IS IT LAST PATTERN?
                                      ;NO, SO DELAY
0178 FF00        MOV   R7,#00H        ;CLEAR INDEX
                 ;
017A 237A NEXT1: MOV   A,#NOTSIX      ;SUBTRACT 6 FROM INDEXR
017C 6E          ADD   A,R6
017D AE          MOV   R6,A
                 ;
017E 09          IN    A,F1
017F 5380        ANL   A,#ONMASK      ;CHECK ON/OFF SW SETTING
0181 C651        JZ    BICBK          ;JUMP IF SW IS SET ON
```

```
0183 4425            JMP    MTROFF          ;SW OFF, THEN SHUT OFF MOTOR
0185 FB04   ;
0185 FB04   MTDLY1: MOV    R3,#4
0187 05     DLYCB1: IN     I                ;DELAY 21 US
0188 FB87           DJNZ   R3,DLYCB1        ;ENABLE CURRENT INTRP.
018A 2412           JMP    MAIN
            ;
018C FB02   BIDLY2: MOV    R3,#2            ;DELAY 5 US
018E 05             IN     I                ;ENABLE CURRENT INTRP.
018F 2412           JMP    MAIN
            ;
0191 B68C   BIDBK:  JF0    BILLY2
0193 09             IN     A,E1
0194 534C           ANI    A,#AGMASK
0196 C6F0           JNZ    SPIN             ;JUMP IF WASH/SPIN-SW ON -SPIN
            ;
0198 F521           MOV    R1,#REVCTR       ;SW SET ON WASH MODE
019A 11             INC    GR1              ;INCREMENT-REVCLUTION
019B F1             MOV    A,GR1
019C C6AC           JNZ    IOWDLY
019E E105           MOV    GR1,#=250        ;IF NOT ZERO THEN DELAY
01A0 19             INC    GR1              ;IOAD-REVCTR-WITH -=250
01A1 11             INC    GR1
01A2 F1             MOV    A,GR1
01A3 C6PC           JZ     WASH             ;JUMP IF REV. CCUNT ZERO
01A5 FB02           MOV    R3,#2            ;DELAY 15 US
01A7 05     DLYCB3: IN     I
01A8 FEA7           DJNZ   R3,DLYCB3
01AA 2412           JMP    MAIN
            ;
01AC FB04   IOWDLY: MOV    R3,#4            ;DELAY 27 US
01AE 24A7           JMP    DLYCB3
            ;
01B0 05     SPIN:   IN     A,P1
01B1 5308           ANL    A,#SPEEDS        ;CHECK SPEED SW
01B3 C6AC           JNZ    IOWDLY           ;JUMP-IF SW IS NOT-FUSE
01B5 F8AC           MOV    R0,ICWDLY        ;DEBOUNCE CHECK SPEED SW
            ;
```

```
01F7 C5              CPL     F0              ;SET HI SPEED WINDING FLAG
01F8 5AFF        ;
01F8 5AFF            CRL     F2,#0FFH        ;SHUT OFF THE MOTOR
01FA 4445            JMP     RELAY
                 ;
01FC F4AC       WASB: CALL   IODREV
01FE 4411            JMP     WASH1
                 ;
0201             ORG     201B
                 ;
0201 04              DB      FOUR            ;CW + 1
0202 02              DB      TWO             ;CW + 2
0203 06              DB      SIX             ;MONITOR
0204 00              DB      ZERO            ;CW + 4
                 ;
0205             ORG     205B
                 ;
0205 00              DB      ZERO            ;CCW + 1
0206 02              DB      TWO             ;CCW + 2
0207 06              DB      SIX             ;MONITOR
0208 04              DB      FOUR            ;CCW + 4
                 ;
0209 5AFF       MTROFF: CRL  F2,#0FFH        ;IF '1' SHUT MOTOR OFF ANI
020B            ;
020B FD24            MOV     R5,#4
020D 05         WAIT1:  IN    A,P1
020E 5307            ANI    A,#00000111B
0210 962D            JNZ    WAIT1
0212 54CD            CALL   DLY20           ;WAIT UNTIL NO BACK EMF
0214 EE0D            DJNZ   R5,WAIT1        ;20-MS-DEBOUNCE CHECK
                 ;
0216 FD32            MOV     R5,#50
0218 54CD       WAIT2: CALL  DLY20           ;DELAY-2-SECOND
021A EE18            DJNZ   R5,WAIT2
021C 0409            JMP     INITI2          ;START FROM INITIALIZATION
                 ;
021E FE        WASH1: MOV    A,R6            ;USE INDEXR TO OUTPUT
021F 0306            ADD    A,#06H           ;MONITOR PATTERN
0221 E3              MOVP3  A,@A
```

```
0222 3A              OUTL    P2,A
0220 ;
0221 BC14            MOV     R4,#MONTIM
0225 DC25    MONDLY: DJNZ    R4,MONDLY
0227 ;
0227 23FF            MOV     A,#0FFH         ;SHUT OFF MOTOR
0229 3A              OUTL    P2,A
022A ;
022A BB06            MOV     R3,#06H         ;DELAY 3.0 MS
022C 5409            CALL    DLY500
022E ;
022E 23D5    BRAKE:  MOV     A,#10010101B    ;TURN ON THE MOTOR RAIL
0230 3A              OUTL    P2,A            ;BRAKE THE MOTOR
0231 ;
0231 BB19            MOV     R3,#25          ;DELAY 12.5 MS
0233 5409            CALL    DLY500
0235 ;
0235 23FF            MOV     A,#0FFH         ;SHUT MOTOR OFF
0237 3A              OUTL    P2,A
0238 ;
0238 BB06            MOV     R3,#06H         ;DELAY 3.0 MS
023A 5409            CALL    DLY500
023C ;
023C B920    	        MOV     R1,#DIRECT      ;CHECK ROTATION DIRECTION
023E F1              MOV     A,@R1
023F 1243            JEQ     AGITAT
0241 0475            JMP     SPIN2

0243 0434    AGITAT: JMP     SPIN1           ;CHANGE TO CW
0245 ;
0245 9EE1    RELAY:  ANL     BUS,#RLYON      ;TURN ON RELAY
0247 ;
0247 BB14            MOV     R3,#20          ;DELAY 10 MS
0249 5409            CALL    DLY500
024B ;
024B BC23    TRACK:  MOV     R1,#DATA1       ;DETECTING EDGE TRANSITION
024D 09              IN      A,P1
024E 5307            ANL     A,#AILB1
0250 A1              MOV     @R1,A           ;STORE THE 1ST BIT PATTERN
```

```
0251 18            ;SAME:    INC     R1
0252 BC03                   SAME2:   MOV     R4,#LOWTIM
0254 09            SAME1:   IN      A,F1
0255 5327                   ANI     A,#ALLHI
0257 C6C4                   JZ      RETURN              ;JUMP IF ALL ZERO
0259 A1                     MOV     @R1,A
025A D327                   XRI     A,#ALLHI
025C C6C4                   JZ      RETURN              ;JUMP IF ALL HIGH
025E F1                     MOV     A,@R1
025F CB                     DEC     R1
0260 11                     INC     R1
0261 C6E:                   XRI     A,@R1               ;CHECK DATA1 = DATA2?
                            JZ      SAME                ;JUMP IF SAME
                   ;
0263 F1            DIFFR:   MOV     A,@R1               ;NO, THEY ARE DIFFERENT
0264 37                     CPL     A
0265 19                     INC     R1
0266 61                     ADD     A,@R1               ;DATA2 - DATA1 = (R3)
0267 0301                   ADDI    A,#01H
0269 A3                     MOV     @R3,A
                   ;
026A F303                   XRL     A,@R3
026C C6E2                   JZ      SAME2               ;JUMP IF DIFFR = 0
026E 1E                     MOV     A,R2
026F D3F1                   XRI     A,#DIFF1
0271 C6E2                   JZ      SAME2               ;JUMP IF DIFFR = -?
                   ;
0273 B920                   MOV     R1,#DIRECT          ;CHECK ROTATION DIRECTION
0275 F1                     MOV     A,@R1
0276 1286                   JB2     REVERS              ;JUMP IF CW
0278 F688                   JF0     REVER1              ;JUMP IF HI SPEED WINDING
027A EE                     MOV     A,R3                ;CCW DIRECTION, GET CW INDEXR
027B F1                     JB7     NEGAT               ;IS (R3) CONTAINS +/-?
027C B261         FOBWAR:   MOV     A,@R1               ;(R3) IS + THEN
                  FORWR1:   MOV
027F 0304                   ADDI    A,#OFFSET           ;(R3) PLUS OFFSET VALE 4
0281 4485                   JMP     DIFFR1

0281 23FC         NEGAT:   MOV     A,#NOT4             ;(R3) IS NEGATIVE THEN
0283 6B                     ADD     A,R3                ;(R3) MINUS OFFSET VALUE 4
0284 4485                   JMP     DIFFR1
```

```
02EE E67A       457 ;
02EE EB        458 REVERS: JFO   FORWR1        ;JUMP IF BI SPEED WINDING
02EF EB        459 REVER1: MOV   A,R3          ;CW DIRECTION, GET CCW INDEXR
02EC A3        460 DIFFR1: MOVP  A,@A          ;TO CURRENT PAGE TABLE LOOK-UP
028A AE        461         MOV   R6,A          ; STORE INTO INDEXR REGISTER
02BF E696      462 ;
               463         JF0   RETF0         ;JUMP IF HI-SPEED
               464 ;
02BF F1        465         MOV   R1,#DATA2
0291 C9        466         MOV   A,@R1
0290 C9        467         DEC   R1
0291 A1        468         MOV   @R1,A         ;DATA1 = DATA2
0292 4451      469         JMP   SAVE
               470 ;
0294 EC54      471 RETURN: DJNZ  R4,SAVE1
0296 FE        472 RETF0:  MOV   A,R6
0297 AF        473         MOV   R7,A
               474 ;
0298 F520      475         MOV   R1,#DIRECT    ;LET INDEX = INDEXR
029A F1        476         MOV   A,@R1         ;CHECK THE DIRECTION
029B 12A6      477         JB0   CCWDIR
               478 ;
029D E6AA      479 CWDIR:  JF0   CCWDIR1
029F 11        480         INC   GR1
02A0 FE        481 CCWDIR1:MOV   A,R6
02A1 030C      482         ADD   A,#CCWTABEI   ;ADD CW PATTERN OFFSET VALUE
02A3 AE        483         MOV   R6,A          ;INTO INDEXR
02A4 2412      484         JMP   MAIN
               485 ;
02A6 E6A0      486 CCWDIR: JF0   CWDIR1        ;JUMP IF HI SPEED WI
02A8 B100      487         MOV   GR1,#00B      ;CHANGE TO CCW DIREC
02AA 2412      488 CCWDIR1:JMP   MAIN
               489 ;
02AC E0        490 IODRIV: MOVX  A,GR0         ;FOLLOW THE 250/5-SW
02AD 00        491         NOP                 ;RELOAD REVOLUTION C
02AE 08        492         INS   A,BUS
02AF A2        493         CUTI  BUS,A         ;RELOAD THE BUS F/F
02B0 E2BA      494         JB5   FIVE
02B2 B921      495 REV250: MOV   R1,#REVCTR    ;LOAD 250 REV COUNTE
```

```
0214 E106        MOV     GR1,#-250
0216 19          INC     R1
0217 F1FC        MOV     GR1,#-4
0219 83          RET
                 ;
02FA F521 RIVE:  MOV     F1,#REVCTR       ;IOAI 5 REV COUNTER
02FC F1EC        MOV     GR1,#-20
02FF 19          INC     R1
02FF F1FF        MOV     GR1,#-1
02C1 83          RET
                 ;
02C2 F503 DLY25U:MOV     F5,#3
02C4 FDC4        DJNZ    F5,DLYAGN
02C6 83   DLYAGN:RET
                 ;
02C7 FE28 DLY20: MOV     F3,#40           ;20 US DELAY LOOP
02C9 ECA6 DLY500:MOV     R4,#166          ;500 US DELAY LOOP
02CB ECC6 DELAY2:DJNZ    R4,DELAY2        ;5/1.67 US DELAY
02CD DEC9        DJNZ    F3,DLY500
02CF 83          RET
                 ;
02D0 B1          ORG     2FEB
                 ;
02FE 01          DB      ONE
02F5 06          DB      SIX
02FA 05          DB      FIVE              ;CCW - 4
02FB 03          DB      THREE             ;MONITOR
                                           ;CCW - 2
                                           ;CCW - 1
02FC 03          DB      THREE
02FD 06          DB      SIX               ;CW - 4
02FE 05          DB      FIVE              ;MONITOR
02FF 01          DB      ONE               ;CW - 2
                                           ;CW - 1
                 ;
0300             ORG     300B
                 ;
0300 7C          DB      PATTRN            ;RUN CLOCKWISE BIT 1
0301 F5          DB      PATTRN1
0302 73          DB      PATTRN2
```

```
0203 A7          575        LB    PATRN3
0204 4F          576        LB    PATRN4
0205 CF          577        LB    PATRN5
                 578    ;
0206 7F          579        LB    MONITR        ;MONITOR-CW-PATTERN
0207 1F          580        LB    MONIT1
0208 7F          581        LB    MONIT2
0209 1F          582        LB    MONIT3
020A 6F          583        LB    MONIT4
020B CF          584        LB    MONIT5
                 585    ;
020C 5F          586        LB    CCWFAT        ;RUN COUNTER CLOCKWI
020D BF          587        LB    CCWFT1
020E 67          588        LB    CCWFT2
020F E3          589        LB    CCWFT3
0210 75          590        LB    CCWFT4
0211 FC          591        LB    CCWPT5
                 592    ;
0212 7F          593        LB    CCWMCN        ;MONITOR CCW PATTERN
0213 CF          594        LB    CCWMC1
0214 6F          595        LB    CCWMC2
0215 1F          596        LB    CCWMC3
0216 7F          597        LB    CCWMC4
0217 EF          598        LB    CCWMC5
                 599    ;
                 600        INI
```

```
USER SYMBOLS
ACITAT  0243       ALIBI   0007       ERASE   0221       CCWIIR  02A6       CCWIRI  02
CCWCC2  0217       AGMASK  0242       CCWC4   027E                          CCWPT1  00
CCWF14  2075       CCWPC4  0217       CCWPO5  001H       CCWMON  007E       CWDIRI  02
LATAC   0024       CCWFTS  024C       CBICK   011B       CIRRAM  001D       LIFFR   02
LIBMSR  0020       LILTIP  0004       LILAI2  02C1       LIFI2   0007       LLI2S   01
LITAGN  02C4       LIY12P  01BE       LILIEM  02C0       DIY20   02C0       IVTST5  01
IXTTIP  02S2       LITCB1  0167       LITCH3  01A7       EVTST3  0136       IVTSTS  01
FIDIY1  0165       IFFRST  007A       IFRST   0080       IVI     0085       IORWR1  02
MAIN    0112       INITIZ  01EC       INITIZ  0005       LCAIT1  012C       ICIRIV  02
MCNITH  0071       MCNFIT  022A       MONIT1  02ZE       MONIT2  027E       MONIT3  00
CITSS1  0146       MONIIM  0014       MTOFF   0205       NIGAT   0201       NEXT    01
FATRN2  0273       CITS11  0145       CITST3  015C       OITSTS  01E1       CFFSET  00
REVIR   02S6       FATRN4  02A7       FATRN4  004F       FATRNS  005E       FATIRN  02
REVMSK  2010       RETURN  02S6       REV2S0  02E2       RIVE    022A       REVCT1  02
SPEILIS 002E       RLICH   01F0       RIYON   0IFB       RUN     0021       SAMI    02
TISTC3  0001       SFIN    01F2       SFIN2   0025       SFIN1   003A       SPIN2   00
TISTV4  0002       TISTC4  0002       TISTC5  0004       TISTCC  0004       TISTCW  02
WASE    01FC       TISTVE  0001       TREE    2002       TIMINT  0054       TISTV1  02
                   WASE1   021E       ZIRO    0222
```

ASSEMBLY COMPLETE, NO ERRORS

APPENDIX II

GLOSSARY OF CORRESPONDING SYMBOLS IN FLOWCHARTS AND APPENDIX 1

| Flowcharts | Appendix 1 | Comment |
| --- | --- | --- |
| INDEX | R7 | Place in commutation sequence |
| INDEXR | R6 | Clockwise: 0–5, CCW: 12–17 |
| FLAG1 | F0 | Hi/Low Speed flag, Low=0, Hi=1 |
| FIG. 8 | Lines 1–203 | Initialization |
| Step 321 | Lines 354–370 | Check Wash/Spin switch and jump accordingly |
| MAIN1,MAIN2 | MAIN | Entry point for routine for driving motor in a selected direction |
| FIG. 11 | Lines 385,386 416–447 | Reversing routine |
| Output Off | MTROFF | Motor shutoff |
| Pattern | Lines 402–414 | routine |
| FIG. 12 | EXTINT Lines 205–221 | External Interrupt Routine |
| FIGS. 10,15 | CHECK Lines 250–316 | Low and High Speed Back EMF Routines |
| FIGS. 16 8,9 (rt.) | NEXT Lines 318–373 | Advance in Commutation Sequence, Change Rail Disable |
| FIG. 14 (D) | SPIN Lines 375–384 Jump to RELAY | Automatically shift relay from Low to High Speed on spin mode |
| Relay | RELAY | Relay change routine |
| FIGS. 17,19 | Lines 449–528 | tracks rotor back emf |
| FIG. 11A | BRAKE Lines 424–439 | Braking pattern |

What is claimed is:

1. A control system for an electronically commutated motor including a stationary assembly having a plurality of winding stages adapted to be selectively commutated, and rotatable means associated with the stationary assembly in selective magnetic coupling relation with the winding stages, and means for commutating the winding stages by selectively supplying power thereto in response to a pattern of control signals leaving at least one of the winding stages unpowered at any one time while the other winding stages are powered, the control system comprising:
means coupled to the winding stages for digitizing the voltages across the winding stages;
means responsive to successive patterns of digital signals for generating successive patterns of the control signals for the commutating means; and
a digital computer operating under stored program control, said computer having inputs for the digitized voltages, said computer having memory elements for storing data representing at least one preselected sequence of the patterns of the digital signals and for storing data, corresponding to each pattern of the digital signals, identifying the respective input for the digitized voltage for the at least one unpowered winding stage, said computer successively producing one of the patterns of the digital signals, sensing only the digitized voltage at the identified input corresponding to the one pattern and producing the following pattern in sequence after at least one predetermined logic level of the digitized voltage at the identified input has occurred.

2. The control system as set forth in claim 1 wherein said control signal generating means also comprises means for preventing at least one pattern of control signals from being generated regardless of the patterns of digital signals produced by said computer.

3. The control system as set forth in claim 1 wherein said digital computer comprises means for producing the following pattern in sequence after complementary logic levels of the digitized voltage at the identified input have occurred in a predetermined order.

4. The control system as set forth in claim 1 wherein said digital computer also comprises means for producing the following pattern in sequence after a predetermined time period if the at least one predetermined logic level of the selected digitized voltage has not occurred during the predetermined time period.

5. The control system as set forth in claim 1 further comprising means for comparing the current flowing in the other powered winding stages of the electronically commutated motor with a predetermined level, and upon the level being exceeded, interrupting said digital computer and also causing said control signal generating means to generate a pattern of control signals to reduce the current.

6. The control system as set forth in claim 5 wherein said digital computer also comprises means for enabling motor operation to resume after a predetermined time interval upon the interruption of said digital computer.

7. The control system as set forth in claim 1 wherein said digital computer also has memory elements for storing data representing a respective predetermined order of complementary logic levels of the digitized voltage corresponding to each pattern in the at least one preselected sequence, each predetermined order for each pattern being the reverse of the predetermined order for the next previous pattern in the at least one preselected sequence, and said digital computer comprises means for producing the following pattern in sequence after complementary logic levels of the digitized voltage at the identified input have been sensed in the predetermined order corresponding to the one pattern.

8. The control system as set forth in claim 1 wherein said means for digitizing the voltages includes means for providing a voltage corresponding to a neutral for the winding stages and further includes a plurality of comparators each having an output and first and second input terminals, the first input terminals being respectively coupled to the respective winding stages, the second input terminals being coupled to the neutral voltage means, the output terminals being respectively coupled to the inputs of said digital computer.

9. The control system as set forth in claim 1 further comprising means for comparing the current flowing in the other powered winding stages of the electronically commutated motor with a predetermined level, and upon the level being exceeded, interrupting said digital computer and also causing said control signal generating means to generate a pattern of control signals to discontinue the supply of power to the winding stages, said digital computer also comprising means for monitoring the position of the rotatable means when the winding stages are thus unpowered and resuming producing patterns of the digital signals after a time interval beginning with a pattern then corresponding to the position of the rotatable means.

10. The control system as set forth in claim 1 further comprising means for comparing the motor current with a predetermined level and latch means for temporarily holding a signal representing whether the motor current has exceeded the predetermined level, said latch means being fed by said comparing means and having at least one output coupled to said control signal generating means and to said digital computer.

11. The control system as set forth in claim 10 further comprising means for supplying a series of pulses at an adjustable rate to said latch means.

12. The control system as set forth in claim 10 wherein said digital computer has a line coupled to said latch means to clear said latch means.

13. An electronically commutated motor system comprising:
   an electronically commutated motor including a stationary assembly having a plurality of winding stages adapted to be selectively commutated, and rotatable means associated with said stationary assembly in selective magnetic coupling relative with said winding stages;
   first and second conductors for supplying power;
   means for commutating said winding stages by selectively switching said winding stages to the supply conductors in response to a pattern of control signals leaving at least one of said winding stages unpowered at any one time while the other said winding stages are powered;
   means coupled to said winding stages for digitizing the voltages across said winding stages;
   means responsive to successive patterns of digital signals for generating successive patterns of the control signals for said commutating means; and
   a digital computer operating under stored program control, said computer having inputs for the digitized voltages, said computer having memory elements for storing data representing at least one preselected sequence of the patterns of the digital signals and for storing data, corresponding to each pattern of the digital signals, identifying the respective input for the digitized voltage for said at least one unpowered winding stage, said computer successively producing one of the patterns of the digital signals, sensing only the digitized voltage at the identified input corresponding to the one pattern and producing the following pattern in sequence after at least one predetermined logic level of the digitized voltage at the identified input has occurred.

14. The electronically commutated motor system as set forth in claim 13 wherein said control signal generating means also comprises means for preventing at least one pattern of control signals from being generated regardless of the patterns of digital signals produced by said computer.

15. The electronically commutated motor system as set forth in claim 13 wherein said digital computer comprises means for producing the following pattern in sequence after complementary logic levels of the digitized voltage at the identified input have occurred in a predetermined order.

16. The electronically commutated motor system as set forth in claim 13 wherein said digital computer also comprises means for producing the following pattern in sequence after a predetermined time period if the at least one predetermined logic level of the selected digitized voltage has not occurred during the predetermined time period.

17. The electronically commutated motor system as set forth in claim 13 further comprising means for comparing the current flowing in said other powered winding stages of said electronically commutated motor with a predetermined level, and upon the level being exceeded, interrupting said digital computer and also causing said control signal generating means to generate a pattern of control signals to reduce the current.

18. The electronically commutated motor system as set forth in claim 17 wherein said digital computer also comprises means for enabling motor operation to resume after a predetermined time interval upon the interruption of said digital computer.

19. The electronically commutated motor system as set forth in claim 13 wherein said commutating means comprises sets of electronic devices connected across said supply conductors, each set having at least one junction point connected to a respective one of said winding stages, each of said electronic devices respectively being able to be switched by a corresponding one of the control signals in each pattern of control signals.

20. The electronically commutated motor system as set forth in claim 19 wherein each set of electronic devices includes a pair of said electronic devices connected in series.

21. The electronically commutated motor system as set forth in claim 19 wherein said control signal generating means comprises first logic circuit means having respective inputs to which the digital signals in each pattern are coupled and having outputs coupled to said electronic devices respectively, and second logic circuit means for disabling the first logic circuit means whenever the digital signals could otherwise cause said electronic devices to short said supply conductors.

22. The electronically commutated motor system as set forth in claim 19 further comprising means for comparing the current flowing in said winding stages of said electronically commutated motor with a predetermined level, and upon the level being exceeded, interrupting said digital computer, said digital computer also having memory locations for storing data identifying one of said first and second conductors corresponding to each pattern of the digital signals, said digital computer also comprising means for disabling switching by said electronic devices to said one identified conductor corresponding to the pattern of the digital signals which is being produced when the interrupting occurs.

23. The electronically commutated motor system as set forth in claim 13 wherein said control signal generating means comprising first and second logic gate means for feeding said commutating means and having inputs driven by respective pairs of digital signals in the digital signal patterns, means for disabling said first and second logic gate means when any of the pairs of digital signals has identical logic levels in the pair, and means for disabling at least one of said first and second logic gate means in response to a signal to cause the current in said other powered winding stages to be reduced.

24. The electronically commutated motor system as set forth in claim 13 wherein said digital computer also comprises means for counting revolutions of said rotatable means by counting the successive patterns of digital signals produced.

* * * * *